United States Patent
Elgamal et al.

(10) Patent No.: US 6,898,248 B1
(45) Date of Patent: May 24, 2005

(54) SYSTEM EMPLOYING THREADED SPACE-TIME ARCHITECTURE FOR TRANSPORTING SYMBOLS AND RECEIVERS FOR MULTI-USER DETECTION AND DECODING OF SYMBOLS

(75) Inventors: Hesham Elgamal, Laurel, MD (US); A. Roger Hammons, Jr., North Potomac, MD (US)

(73) Assignee: Hughes Electronics Corporation, El Segundo, CA (US)

( * ) Notice: Subject to any disclaimer, the term of this patent is extended or adjusted under 35 U.S.C. 154(b) by 1021 days.

(21) Appl. No.: 09/613,938

(22) Filed: Jul. 11, 2000

Related U.S. Application Data

(60) Provisional application No. 60/143,293, filed on Jul. 12, 1999.

(51) Int. Cl.[7] ............................................... H04L 27/00
(52) U.S. Cl. ....................................................... 375/259
(58) Field of Search ................................ 375/259, 299, 375/260, 295, 262, 265, 267, 347, 341; 714/794, 795

(56) References Cited

U.S. PATENT DOCUMENTS

| | | | | |
|---|---|---|---|---|
| 6,115,427 A | * | 9/2000 | Calderbank et al. | ........ 375/267 |
| 6,351,499 B1 | * | 2/2002 | Paulraj et al. | ............... 375/267 |
| 6,470,043 B1 | * | 10/2002 | Lo et al. | ...................... 375/144 |
| 6,473,467 B1 | * | 10/2002 | Wallace et al. | ............. 375/267 |
| 6,510,173 B1 | * | 1/2003 | Garmonov et al. | ......... 375/141 |
| 6,560,295 B1 | * | 5/2003 | Hammons et al. | .......... 375/299 |

* cited by examiner

*Primary Examiner*—Khai Tran
(74) *Attorney, Agent, or Firm*—John T. Whelan

(57) ABSTRACT

A threaded space-time (TST) architecture in a multiple antenna wireless communication system uses the coded transmission in each layer of a transmission resource array as a space-time code. Each layer of a layer set is active during all available symbol transmission intervals, and each of the transmit antennas are used equally often, such that layers each transmit a symbol using a different antenna during each symbol transmission interval. A receiver is provided for multi-user reception using an iterative, soft-input/soft-output (SISO) multi-user detection algorithm based on minimum mean square error (MMSE) criterion, among other methods.

24 Claims, 10 Drawing Sheets

SYSTEM EMPLOYING THREADED SPACE-TIME ARCHITECTURE FOR TRANSPORTING SYMBOLS AND RECEIVERS FOR MULTI-USER DETECTION AND DECODING OF SYMBOLS

This application claims the benefit of provisional U.S. application Ser. No. 60/143,293, filed Jul. 12, 1999.

CROSS REFERENCE TO RELATED APPLICATIONS

Related subject matter is disclosed in U.S. patent application Ser. No. 09/397,896, filed Sep. 17, 1999, and U.S. patent application Ser. No. 09/613,607 of A. Roger Hammons et al for "Method of Generating Space-Time Codes for Generalized Layered Space-Time Architectures", filed even date herewith, the entire contents of both of said applications being expressly incorporated herein by reference.

FIELD OF THE INVENTION

The invention relates generally to a method of symbol transmission employing space-time codes in a multiple antenna wireless communication system. The invention also relates to a method and apparatus for space-time signal processing and multi-user detection and decoding in a multiple antenna wireless communication system.

BACKGROUND OF THE INVENTION

Unlike the Gaussian channel, the wireless channel suffers from multi-path fading. In such fading environments, reliable communication is made possible only through the use of diversity techniques in which the receiver is afforded multiple replicas of the transmitted signal under varying channel conditions. Recently, information theoretic studies have shown that spatial diversity provided by multiple transmit and/or receive antennas allows for a significant increase in the capacity of wireless communication systems operated in a Rayleigh fading environment. Following this research, two approaches for exploiting this spatial diversity have been proposed.

In accordance with one approach, channel coding is performed across the spatial dimension, as well as time, to benefit from the spatial diversity provided by using multiple transmit antennas. Accordingly, the term "space-time codes" is used in connection with this coding scheme. One potential drawback of this scheme is that the complexity of the maximum likelihood (ML) decoder is exponential in the number of transmit antennas.

A second approach relies on complex signal processing techniques at the receiver to achieve performance asymptotically close to the outage capacity. In this approach, no effort is made to optimize the channel coding scheme. Conventional single-dimensional channel codes are used to minimize complexity. This approach is referred to as the layered space-time (LST) architecture. The LST architecture involves formulating the problem as a multi-user detection problem at the receiver and, hence, capitalizing on existing multi-user detection techniques in the receiver design. A proposed algorithm is based on a combination of decision feedback interference cancellation and zero-forcing interference avoidance. One drawback of the LST architecture is that the number of receive antennas must be at least equal to the number of transmit antennas. The LST signal processing does not gain the maximum diversity advantage that space-time coding offers. At low signal-to-noise ratios, this approach may suffer from error propagation resulting from the decision feedback cancellation.

SUMMARY OF THE INVENTION

In accordance with the present invention, novel solutions to problems associated with designing multiple antenna wireless systems are presented.

In accordance with an aspect of the present invention, a receiver is provided for multi-user reception. The receiver provides for joint detection and decoding.

In accordance with another aspect of the present invention, a set of lower complexity reception techniques based on the turbo processing architecture is presented. These techniques provide a trade-off between complexity and performance. Joint detection and decoding algorithms based on the iterative soft-input-soft-output (SISO) approaches are provided. These algorithms avoid the limitations of the LST signal processing techniques, including the need for equal number of transmit and receive antennas.

In accordance with yet another aspect of the present invention, a transmitter employs space-time coding to improve the efficiency of multiple antenna systems. A general architecture that combines efficient algebraic code design with advanced signal processing techniques is employed and is referred to as the threaded space-time (TST) architecture. The TST architecture also allows for exploiting the temporal diversity provided by the time varying fading channel. The existing scheme for combined array processing and space-time coding described above, which likewise addresses some of the problems encountered with LST, relies upon a zero forcing group interference suppression technique and shows performance that is 6-9 dB from the outage capacity. The TST architecture and signal processing of the present invention, however, improves performance to less than 3 dB from the outage capacity. It also provides greater flexibility in terms of the trade-off between power efficiency, bandwidth efficiency, and receiver complexity.

BRIEF DESCRIPTION OF THE DRAWINGS

The various aspects, advantages and novel features of the present invention will be more readily comprehended from the following detailed description when read in conjunction with the appended drawings, in which.

Throughout the drawing figures, like reference numerals will be understood to refer to like parts and components.

DETAILED DESCRIPTION OF THE PREFERRED EMBODIMENTS

The description below shall be organized as follows: the system description and a brief review of previous work on the design of space-time modems are presented in Section 1. In Section 2, the optimal receiver for joint detection and decoding is identified, and a set of iterative receivers that provide a trade-off between complexity and performance is presented. The application of iterative receivers to the layered space-time architecture is discussed in Section 2.3. In Section 3, a novel approach for joint space-time transmitter/receiver design is presented that combines efficient multi-user detection with space-time coding. Algebraic space-time code constructions for the new architecture are provided in Section 3.2. Comparisons of the various layered architectures in terms of efficiency and achievable diversity order are presented in Section 4, while simulation results are compared in Section 5. Finally, Section 6 presents conclusions.

1. Overview of Space-Time Concepts

In this section, the basic concepts for space-time signal design and signal processing are described. Important concepts involved in space-time codes, that is, layered space-time processing, and another proposed hybrid multi-layered approach, are briefly explained.

1.1 Signal Model

Figure 1:
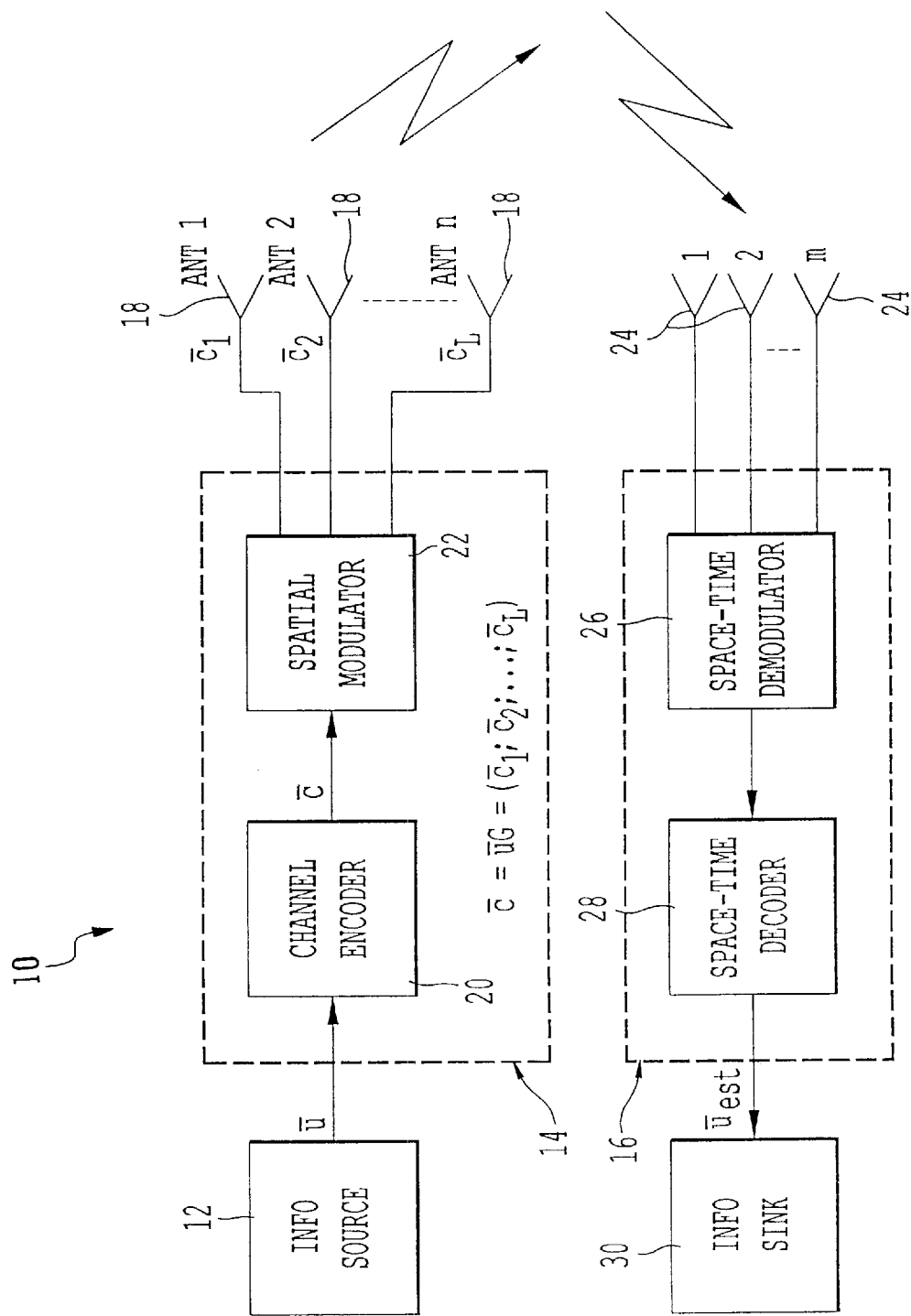
FIG. 1 is a block diagram of a multiple antenna wireless communication system constructed in accordance with an embodiment of the present invention.

A multiple antenna communication system 10 with n transmit antennas 18 and m receive antennas 24 as shown in FIG. 1. In this system 10, the channel encoder 20 in the transmitter 14 accepts input from an information source 12 and outputs a coded stream of higher redundancy suitable for error correction processing at the receiver 16. The encoded output stream is modulated via a spatial modulator 22 and distributed among the n antennas 18. The transmissions from each of the n transmit antennas 18 are simultaneous and synchronous. The signal received at each antenna 24 is therefore a superposition of the n transmitted signals corrupted by additive white Gaussian noise and multiplicative fading. The signal is processed by a demodulator 26 and a decoder 28 and provided to an information sink 30.

Assume that the transmitter 14 is capable of an aggregate transmission rate of $nR_s$ symbols per second (i.e., a transmission rate of $R_s$ symbols per second per transmit antenna). Then, over a transmission time of T seconds, the transmitter 14 may transmit up to $l=R_s T$ channel symbols per antenna. The space-time transmission resources may therefore be viewed as an n×l array whose (i, t)-th entry represents the t-th symbol interval available on the i-th antenna. The dimension indexed by i is referred to as the spatial dimension, whereas the dimension indexed by t is called the temporal dimension.

In FIG. 1, the channel encoder 20 is a generic function and, in many cases of interest, can be decomposable into a set of multiple, independent channel encoders processing separate substreams from the information source 12. When the channel encoder 20 is decomposable, there is a corresponding partitioning of the spatial modulating function that is of interest. The components of such a partitioning are referred to as layers or multi-layers.

At the receiver 16, the signal $r_t^j$ received by antenna j at time t is given by $$r_t^j = \sqrt{E_s} \sum_{i=1}^{n} \alpha_t^{(ij)} c_t^i + n_t^j \quad (1)$$

where $\sqrt{E_s}$ is the energy per transmitted symbol; $\alpha_t^{(ij)}$ is the complex path gain from transmit antenna i to receive antenna j at time t; $c_t^i$ is the symbol transmitted from antenna i at time t; $n_t^j$ is the additive white Gaussian noise sample for receive antenna j at time t. The noise samples are independent samples of zero-mean complex Gaussian random variable with variance $N_0/2$ per dimension. The different path gains $\alpha_t^{(ij)}$ are assumed to be statistically independent. The fading model of primary interest is that of a block flat Rayleigh fading process in which the code word encompasses B fading blocks. The complex fading gains are constant over one fading block but are independent from block to block. The quasi-static fading model has been studied which is a special case of the block fading model in which B=1.

The received signal can be expressed in vector notation as $$r_t = S_t c_t + n_t \quad (2)$$

where $T_t$ is the m×1 received vector at time t; $S_t$ is the m×n complex signature matrix whose $i^{th}$ column corresponds to the path gains for the $i^{th}$ antenna; $c_t$ is the n×1 transmitted vector at time t; $n_t$ is the m×1 white Gaussian noise vector.

The system 10 provides not one, but nm, communication links between sender and receiver, corresponding to each distinct transmit/receive antenna pairing. The objective of space-time system design is to use these statistically independent, but mutually interfering, communication links to increase system throughput and quality of service by exploiting the spatial and temporal diversity available in the system.

1.2 Space-Time Channel Codes

For space-time channel code design, assume that the channel encoder 20 of FIG. 1 is indecomposable. The primary design objective is therefore to provide channel codes that exploit the full transmission resource array and provide the highest level of spatial diversity at the receiver 16.

In the concept of a space-time code, the channel encoding, modulation, and distribution of symbols across antennas are intrinsically connected. Given a set X, the space of 1×m row vectors and the space of n×m matrices taking values in X will be denoted by $X^m$ and $X^{n \times m}$, respectively. Then, a block code of length N over the discrete symbol alphabet y is a subset C of the N-dimensional space $y^N$. Usually, the number of code words in C is a power of the alphabet size, $|C|=|y|^k$, so that there is a one-to-one mapping, $\gamma: y^k \to C$, of information k-tuples onto code words. The mapping $\gamma$ is an encoder for C. In this paper, we will be primarily interested in the case in which C is a binary linear code—i.e., y is the elementary binary field $\mathbb{F}=GF(2)$.

The baseband modulation mapping $\mu: y^b \to \Omega$ assigns to each b-tuple of alphabet symbols a unique point in the discrete, complex-valued signaling constellation $\Omega$, which is assumed not to contain the point zero. Conversely, the inverse map $\mu^{-1}$ provides a b-symbol labeling of the constellation points. By extension, $\mu(\underline{x})$ denotes the modulated version of the vector $\underline{x} \in y^N$. In this case, it is understood that N must be a multiple of b and that the blocking of symbols into b-tuples for the modulator is performed left to right.

Let $\Omega^* = \Omega \cup \{0\}$ denote the expanded constellation. Then, the spatial modulator is a mapping $f: y^N \to (\Omega^*)^{n \times l}$ that sends the vector $\underline{x}$ to an n×l complex-valued matrix c=f($\underline{x}$), whose non-zero entries are a rearrangement of the entries of $\mu(\underline{x})$. Specifically, c is the baseband version of the code word $\underline{x}$ as transmitted across the channel. Thus, in the notation of equation (1), the matrix c has (i, t)-th entry equal to $c_t^i$. Note that, in this formulation, it is expressly allowed that no symbol be transmitted by a given antenna at a given signaling interval; thus, N/b≦nl. n and l are referred to, respectively, as the spatial span and temporal span of f.

Finally, for convenience, let $\hat{c}=\mu^{-1}(c)$ denote the n×bl matrix in which each constellation point is replaced by its b-symbol label and any zero entry is replaced by a b-tuple of special blank symbols. The map σ: $\underline{x} \rightarrow \hat{c}$ is called the spatial formatter.

Definition 1 A space-time code C consists of an underlying channel code C together with the spatial modulator function f.

The fundamental performance parameters for space-time codes are the following: (1) diversity advantage, which describes the exponential decrease of decoded error rate versus signal-to-noise ratio (asymptotic slope of the performance curve in a log-log scale); and (2) coding advantage which does not affect the asymptotic slope but results in a shift in the performance curve. The diversity advantage is the more critical of the two performance metrics as it determines the asymptotic slope of the performance curve. Ideally, the coding advantage should be optimized after the diversity advantage is maximized.

For quasi-static fading channels, it has been shown that the spatial diversity advantage of the code, assuming ML decoding, is the product of the number of receive antennas 24 and the minimum rank among the set of complex valued matrices associated with the difference between baseband modulated code words. It is clear that full spatial diversity nm will be achieved if and only if all the difference matrices have full rank. Based on this design criterion, simple design rules have been proposed for space-time trellis codes for 2-level spatial diversity.

Rule 1. Transitions departing from the same state differ only in the second symbol.

Rule 2. Transitions merging at the same state differ only in the first symbol.

When these rules are followed, the code word difference matrices are of the form $$f(\underline{x}_c) - f(\underline{x}_e) = \begin{bmatrix} \delta_1 & & 0 \\ \cdots & \cdots & \cdots \\ 0 & & \delta_2 \end{bmatrix}$$

with $\delta_1$, $\delta_2$ nonzero complex numbers. Thus, every such difference matrix has full rank, and the space-time code achieves 2-level spatial diversity. Two good trellis codes that satisfy these design rules, and several others that do not, were handcrafted using computer search methods.

The fact that this design criterion applies to the complex domain, rather than the discrete domain in which the codes are designed, has hindered the development of more general results. The following binary rank criterion for BPSK-modulated, binary space-time codes have also been developed:

Theorem 2 (Binary Rank Criterion) Let C be a linear n×l space-time code with underlying binary code C of length N=nl where l≧n. Suppose that every non-zero code word $\hat{c}$ is a matrix of full rank over the binary field $\mathbb{F}$. Then, for BPSK transmission over the quasi-static fading channel, the space-time code C achieves full spatial diversity nm.

Using the binary rank criterion, the following construction for space-time codes is proposed which is referred to as the stacking construction.

Theorem 3 (Stacking Construction) Let $M_1, M_2, \ldots, M_n$ be binary matrices of dimension k×l, l≧k, and let C be the n×l space-time code of dimension k consisting of the code word matrices $$\hat{c} = \begin{bmatrix} \underline{x}M_1 \\ \underline{x}M_2 \\ \vdots \\ \underline{x}M_n \end{bmatrix},$$

where $\underline{x}$ denotes an arbitrary k-tuple of information bits and n≦l. Then C satisfies the binary rank criterion, and thus, for BPSK transmission over the quasi-static fading channel, achieves full spatial diversity nm, if and only if $M_1$, $M_2, \ldots, M_n$ have the property that $\forall a_1, a_2, \ldots, a_n \in \mathbb{F}$:

$M = a_1 M_1 \oplus a_2 M_2 \oplus \ldots \oplus a_n M_n$ is of full rank k unless $a_1 = a_2 = \ldots = a_n = 0$.

It is clear that this construction is general for any number of antennas and, generalized in the obvious fashion, applies to trellis, as well as block codes. This construction, and a similar version for QPSK transmission (in which case y=$\mathbb{Z}_4$, the integers modulo 4, and b=1), have been shown to encompass, as special cases, transmit delay diversity, the afore-mentioned hand-crafted trellis codes, rate 1/n convolutional codes, and certain block and concatenated coding schemes. The generator polynomials for rate 1/n convolutional codes with the best minimum distance that achieve full spatial diversity are discussed in the above-referenced patent application Ser. No. 09/397,896.

1.3 Layered Space-Time Architectures

In the layered space-time processing approach, the channel encoder 20 of FIG. 1 is composite, and the multiple, independent coded streams are distributed throughout the transmission resource array in layers. The primary design objective is to design the layering architecture and associated signal processing so that the receiver can efficiently separate the individual layers from one another and can decode each of the layers effectively. In these schemes, there is no spatial interference among symbols transmitted within a layer (unlike the space-time code design approach); hence, conventional channel codes can be used while the effects of spatial interference are addressed primarily in the signal processor design.

Different layering schemes are provided for the proposed Bell Laboratories Layered Space-Time (BLAST) architecture. In the simplest variation, the code words are transmitted in horizontal layers. The preferred scheme, however, involves the transmission of code words in diagonal layers. The notion of a layer is generalized herein as a section of the transmission resources array having he property that each symbol interval within the section is allocated to at most one antenna. This property ensures that all spatial interference experienced by the layer comes from outside the layer. A layer has the further structural property that a set of spatial and/or temporal cyclic shifts of the layer within the transmission resource array provides a partitioning of the transmission resource array. This allows for a simple repeated use of the layer pattern for transmission of multiple, independent coded streams.

Formally, a layer in an n×l transmission resource array may be identified by an indexing set $L \subset I_n \times I_l$ having the property that the t-th symbol interval on antenna a belongs to the layer if and only if (a, t)∈L. Then, a layer requires that, if (a, t)∈L and (a', t')∈L, then either t≠t' or a=a'—i.e., that a is a function of t.

Now, consider a composite channel encoder γ consisting of n constituent encoders $\gamma_1, \gamma_2, \ldots, \gamma_n$ operating on independent information streams. Let $\gamma_i: y^{k_i} \to y^{N_i}$, so that $k=k_1+k_2+\ldots+k_n$ and $N=N_1+N_2+\ldots+N_n$. Then, there is a partitioning $\underline{u}=\underline{u}_1|\underline{u}_2|\ldots\underline{u}_{n-1}$ of the composite information vector $\underline{u} \in y^k$ into a set of disjoint component vectors $\underline{u}_i$, of length $k_i$, and a corresponding partitioning $\gamma(\underline{u})=\gamma_1(\underline{u}_1)|\gamma_2(\underline{u}_2)|\ldots|\gamma_n(\underline{u}_n)$ of the composite code word $\gamma(\underline{u})$ into a set of constituent code words $\gamma_i(\underline{u}_i)$, of length $N_i$. In the layered architecture approach, the space-time transmitter assigns each of the constituent code words $\gamma_i(\underline{u}_i)$ to one of a set of n disjoint layers. For simpicity, consider the case in which the constituent codes are all of the same rate and have the same code word length: $N_i=N/n$ and $k_i=k/n$ for all i.

There is a corresponding decomposition of the spatial modulating function that is induced by the layering. Let $f_i: y^{N/n} \to (\Omega^*)^{n \times l}$ denote the component spatial modulating function, associated with layer $L_i$, which agrees with the composite spatial modulator f regarding the modulation and formatting of the layer elements but which sets all off-layer elements to complex zero. Then $$f(\gamma(\underline{u}))=f_1(\gamma_1(\underline{u}_1))+f_2(\gamma_2(\underline{u}_2))+\ldots+f_n(\gamma_n(\underline{u}_n)).$$

In the V-BLAST architecture, the transmitter uses n conventional channel encoders and permanently assigns the output of each encoder to one of the n transmit antennas. This corresponds to a partitioning of the transmission resource array into the horizontal layers $$L_i=\{(i,t): 0 \leq t < l\}, \quad (3)$$

where l=N/(nb). Better performance is achieved by the preferred D-BLAST architecture in which the output of each encoder is distributed among the n antennas along the diagonal layers $$L_i=\{(\lfloor t/w \rfloor_n-i+2,t):(i-1)w \leq t < l-(n-i)w\}, \quad (4)$$

where $w=N/(n^2 b)$ is the width of the diagonal, l=(2n−1) w is the temporal span, and $\lfloor \cdot \rfloor_n$ denotes the function returning the integer part of a real-valued input reduced modulo n.

Figure 2:
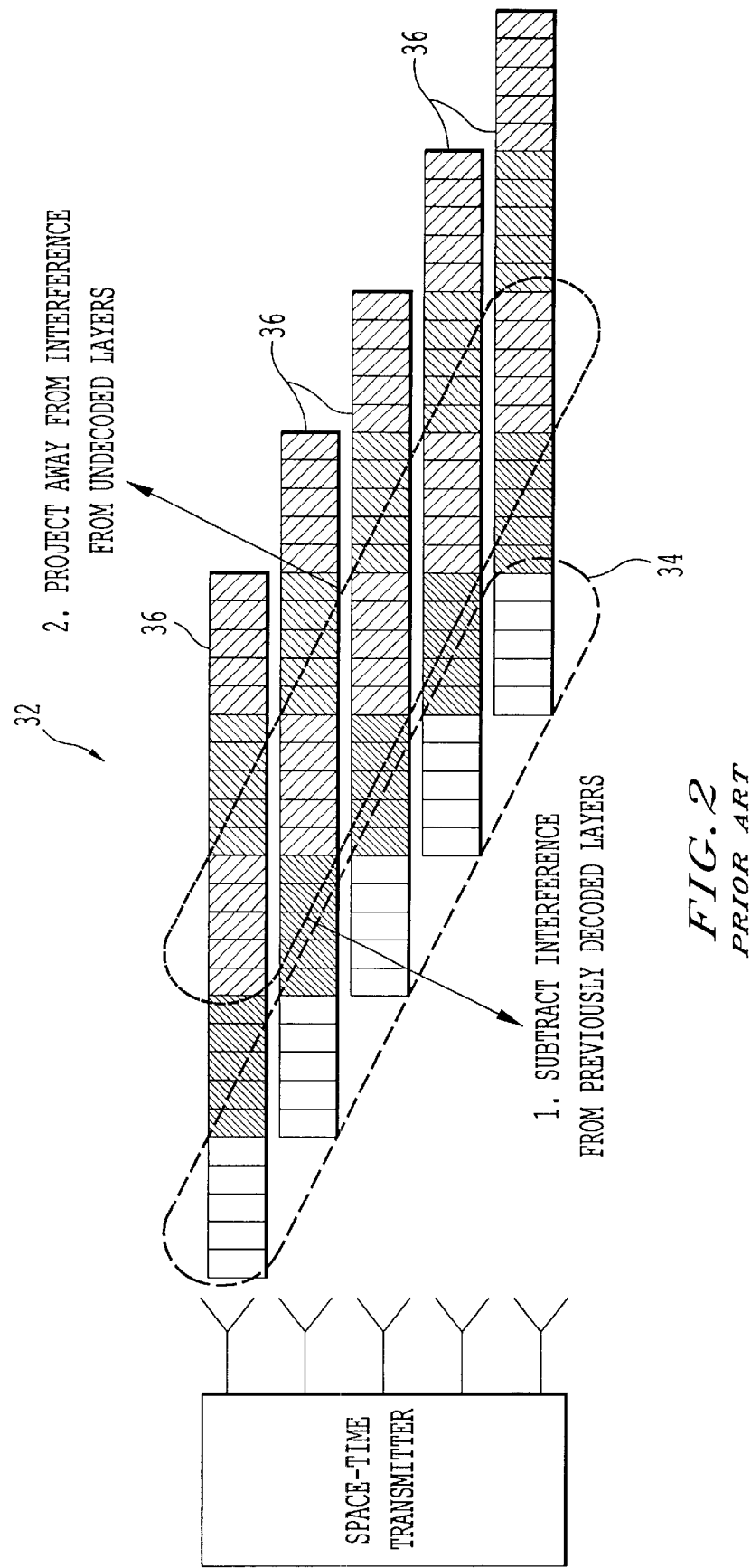
FIG. 2 illustrates a code word matrix encoded and transmitted in accordance with a known layered space-time architecture.

The BLAST receiver uses a multi-user detection strategy based on a combination of interference cancellation and avoidance. In D-BLAST, each diagonal layer constitutes a complete code word, so decoding is performed layer by layer. Consider the code word matrix 32 shown in FIG. 2. The entries below the first diagonal layer 34 are zeros. To decode the first diagonal 34, the receiver generates a soft decision statistic for each entry in that diagonal. In doing so, the interference from the upper diagonals is avoided by projecting the received signal onto the null-space of the upper interference. The soft statistics are then used by the corresponding channel decoder to decode this diagonal. The decoder output is then fed back to cancel the first diagonal contribution in the interference while decoding the next diagonal. The receiver then proceeds to decode the next diagonal in the same manner.

This zero-forcing strategy is only possible if the number of receive antennas m is at least as large as the number of transmit antennas n. Zero-forcing also results in a loss in achievable diversity order that depends on the number of interferers to be avoided. For example, the symbol in the uppermost position will have the maximum diversity order m, whereas the symbol in the lowermost position will have the minimum diversity order 1. Thus, the diagonal layering of the encoded stream is necessary to achieve equal performance for all coded streams. Due to the interference cancellation mechanism, errors can also propagate spatially.

1.4 Multi-Layered Space-Time Architectures

Figure 3:
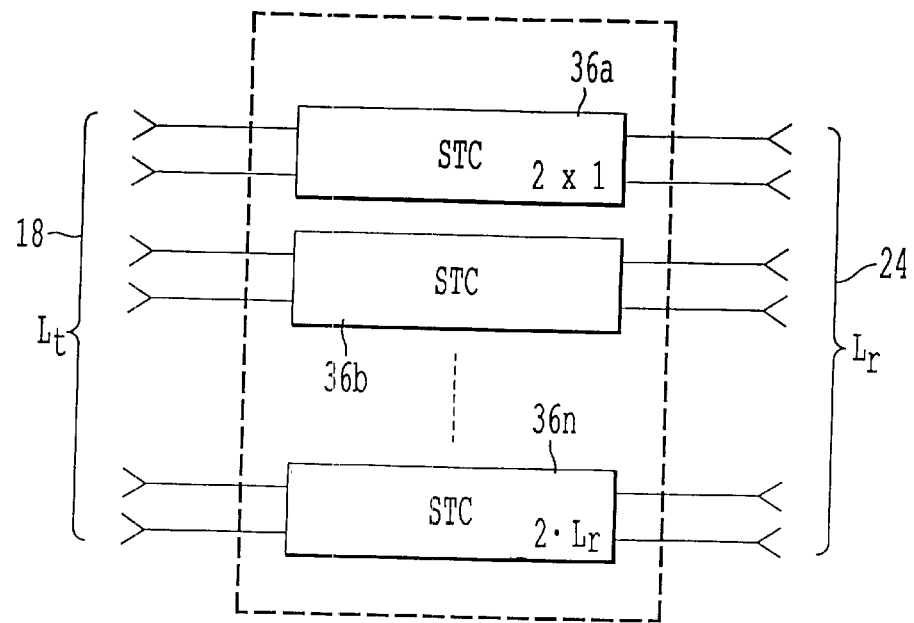
FIG. 3 illustrates space-time codes transmitted in accordance with a known multi-layered space-time architecture.

Multi-layered space-time processing is a hybrid approach involving use of both space-time channel codes and layered processing, as illustrated in FIG. 3. Space-time codes 36a through 36n are used in a conventional manner; however, the number of antennas is limited to facilitate group processing. Since code words are no longer transmitted in a single layer, there is spatial interference among transmitted symbols within a given code word that should be addressed as part of the channel code design.

The group interference suppression technique is proposed. In this scheme, the input stream is divided, for example, into n/n' substreams. The different substreams are encoded using n'-level diversity component trellis codes $C_1, \ldots, C_{n/n'}$. Each component code is then transmitted from n' antennas (horizontal n'-layering). At the receiver, each component code is decoded separately while suppressing signals from other component codes. The group interference suppression strategy is based on the zero-forcing principle and requires that m≥n−n'+1. In quasi-static fading channel, the spatial diversity gain achieved by $C_1$ is n'×(m−n+n'). Assuming correct decoding of $C_1$, its contribution is subtracted from signals at different receive antennas. This gives a communication system with n−n' transmit and m receive antennas. Hence, the space time code $C_2$ affords a diversity gain of n'×(m−n+2n'), and so on. Using the fact that the diversity gain increases with each decoding stage, unequal power levels are allocated to the different component codes. Because all of the aforementioned space-time codes were 2-level diversity codes, except for the delay diversity, known examples were limited to n'=2.

The performance of this architecture was shown to be within 6-9 dB from the outage capacity at frame error rate of $10^{-1}$.

2. Multi-User Detection for Space-Time Applications

In accordance with the present invention, the problem of space-time signal processing is considered to be a multi-user detection problem. Iterative multi-user detection algorithms are provided and their advantages over zero-forcing strategies in layered and multi-layered space-time architectures will be discussed below.

2.1 Optimal Multi-User Detection

Consider the layered space-time architecture in which n binary channel encoders of rate r and constraint length v are used, and each encoder output is assigned to a different layer. It is clear that this system is equivalent to a synchronous code division multiple access (CDMA) system with n user and m spreading gain, where the complex fading coefficients constitute the equivalent spreading sequences. In general, m<n corresponds to an overloaded CDMA system. In such a scenario, the optimum receiver for joint detection and decoding combines the trellises of both the multi-user detector and the channel decoder. This receiver can be realized using a Viterbi algorithm whose complexity is of exponential order $O(2^{rv})$ in the product of the number of antennas and the code constraint length. For some systems, the exponential increase in implementation complexity may make the optimal receiver impractical for even a relatively small number of antennas. Thus, there is a need for alternate receiver architectures that are less complex but still efficient.

2.2 Iterative Multi-User Detection

Figure 4:
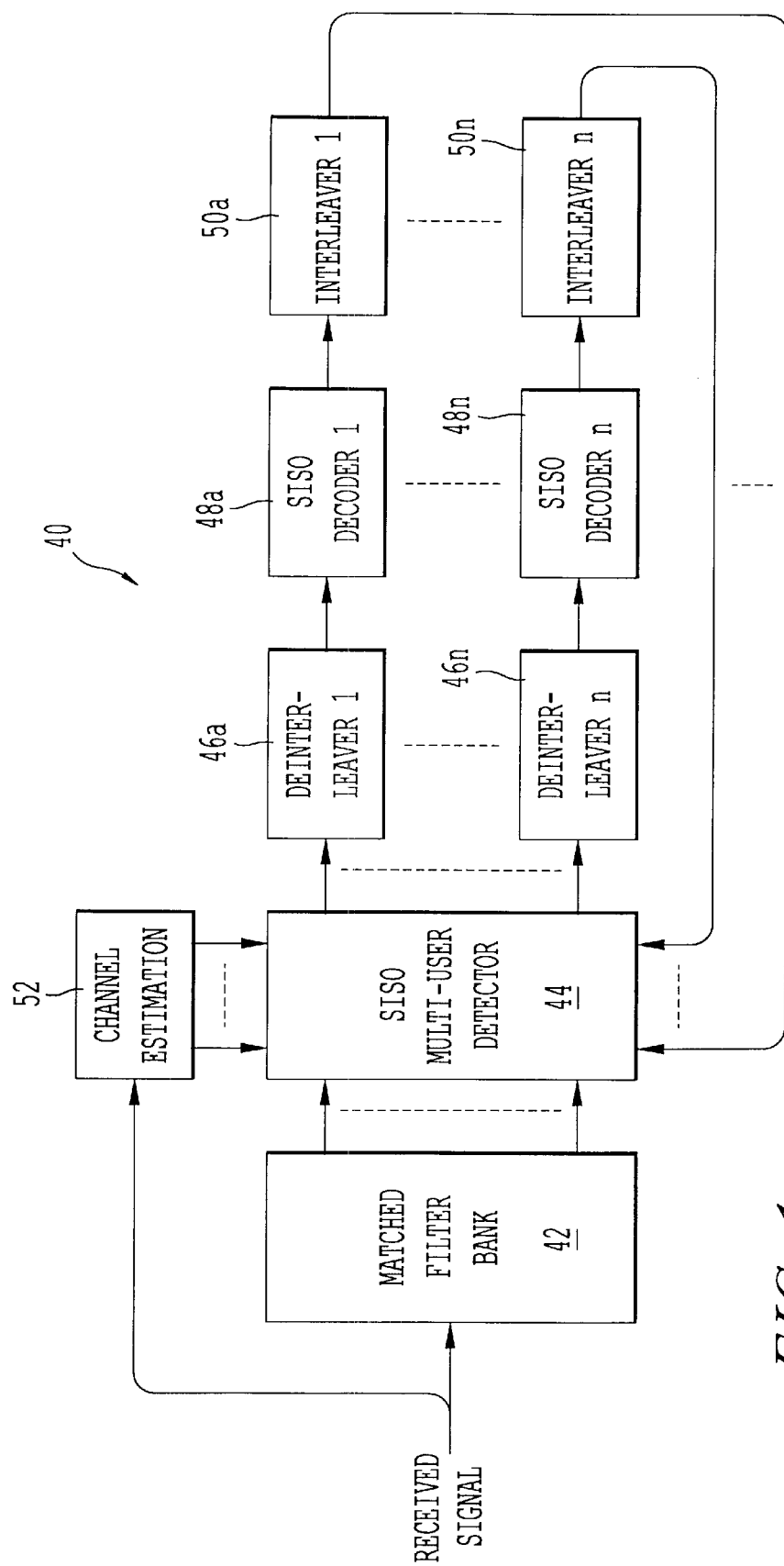
FIG. 4 is a block diagram of a receiver constructed in accordance with an embodiment of the present invention.

In this section, the turbo-processing principle is used to derive a set of iterative multi-user detection algorithms that allow trade-offs to be made between performance and complexity. A block diagram of the iterative receiver 40 is shown in FIG. 4. For simplicity, horizontal layering with binary channel codes (n binary channel encoders coupled to n transmit antennas) and BPSK modulation are assumed. Extension to nonbinary codes and to the multi-layered architecture is straightforward.

With reference to FIG. 4, a receive signal is processed by a matched filter bank 42, and an estimation module 52. A soft-input/soft-output (SISO) multi-user detector module 44 provides joint soft-decision estimates of the n streams of data. Each of the detected streams are decoded by the separate SISO channel decoders 48a through 48n associated with the component channel codes. The detected streams are deinterleaved, as indicated at 46, prior to decoding. The output of the decoder is interleaved again, as indicated at 50a through 50n, to facilitate interleave processing by the multi-user detector. After each decoding iteration, the soft outputs from the channel decoders 48a through 48n are used to refine the processing performed by the SISO multi-user detector 44. In the iterative receiver 40, each of the streams is independently interleaved to facilitate convergence. This aspect of the receiver 40 also influences channel code design.

The SISO channel decoders 48a through 48n can employ any of the following algorithms: (1) the maximum a-posteriori (MAP) approach, which is optimal in the sense that it minimizes the probability of bit error at the decoder output; (2) the (log-MAP) approach, which is a lower complexity, additive version of the (MAP) rule that operates in the log-domain; or (3) the soft output Viterbi algorithm (SOVA). The choice of the decoding technique depends on the available processing power at the receiver 40.

The overall complexity of the iterative receiver 40 depends primarily on the algorithm used by the multi-user detector 44. Therefore, three SISO, multi-user detection algorithms that provide a trade-off between performance and complexity are developed. The first is based on the maximum a-posteriori (MAP) probability rule; the second is based on the minimum mean square error (MMSE) criterion; and the third can be viewed a suboptimal approximation of the iterative MMSE receiver.

In all cases, the derivations require an assumption of statistical independence of the spatial soft decision information. This assumption is sufficiently satisfied in practice by requiring that the transmissions from each of the antennas be independently interleaved.

2.2.1 Iterative MAP Receiver

In this case, the SISO multi-user detector 44 computes the symbol-by-symbol maximum a posteriori (MAP) statistics defined by $$L_t^i \triangleq \log \frac{P\{c_t^i = 1 | \underline{r}_t\}}{P\{c_t^i = 1 | \underline{r}_t\}}.$$

Specifically, the soft decision statistic for $c_t^i$ is updated iteratively via the following rule:

$$L_t^i = \log \frac{\Sigma_{\underline{c}_t \in C^+} P(\underline{r}_t | \underline{c}_t) P(c_t^1, \ldots, c_t^{i-1}, c_t^{i+1}, \ldots, c_t^n)}{\Sigma_{\underline{c}_t \in C^-} P(\underline{r}_t | \underline{c}_t) P(c_t^1, \ldots, c_t^{i-1}, c_t^{i+1}, \ldots, c_t^n)} \quad (5)$$

where $P(\underline{r}_t | \underline{c}_t)$ is the conditional multivariate complex Gaussian distribution of the received vector; $P(C_t^1, \ldots,$ $C_t^{i-1}, C_t^{i+1}, \ldots, C_t^n)$ is the joint a-priori probability distribution of the transmitted symbols; and $$C^+ = \{(c_t^1, \ldots, c_t^{i-1}, +1, c_t^{i+1}, \ldots, c_t^n) : c_t^j \in \{-1, 1\}\} \quad (6)$$

$$C^- = \{(c_t^1, \ldots, c_t^{i-1}, -1, c_t^{i+1}, \ldots, c_t^n) : c_t^j \in \{-1, 1\}\}. \quad (7)$$

The computation of the joint distribution $P(c_t^1, \ldots, c_t^{i-1}, c_t^{i+1}, \ldots, c_t^n)$ is intractable in general without further assumptions. If statistical independence is assumed, then $$P(c_t^1, \ldots, c_t^{i-1}, c_t^{i+1}, \ldots, c_t^n) = P(c_t^1) \ldots P(c_t^{i-1}) P(c_t^{i+1}) \ldots P(c_t^n) \quad (8)$$

In the first iteration, one takes $P(c_t^j = 1) = P(c_t^j = -1) = \frac{1}{2}$. In subsequent iterations, the a-priori probabilities are re-computed based on the previous iteration's extrinsic information, $\lambda_t^j$, corresponding to the symbol transmitted from the j-th antenna at time t:

$$P(c_t^j = 1) = \frac{e^{\lambda_t^j}}{1 + e^{\lambda_t^j}}. \quad (9)$$

Note that, while the fading is assumed independent for each transmit-receive antenna pair, the extrinsic information is generally correlated. The independence assumption is therefore invalidated, unless the separate antenna transmissions are independently interleaved. When different interleaving is used for each antenna transmission, however, the independence assumption is reasonably well approximated.

The MAP approach is used for CDMA applications. For the iterative MAP decoder, the number of terms in each of the summations is preferably $2^{n-1}$. Hence, the complexity of the MAP detector per iteration is $O(n2^n)$, and the overall complexity of the receiver, per iteration, is $O(n[2^n + 2^v])$.

2.2.2 Iterative MMSE Receiver

Figure 5:
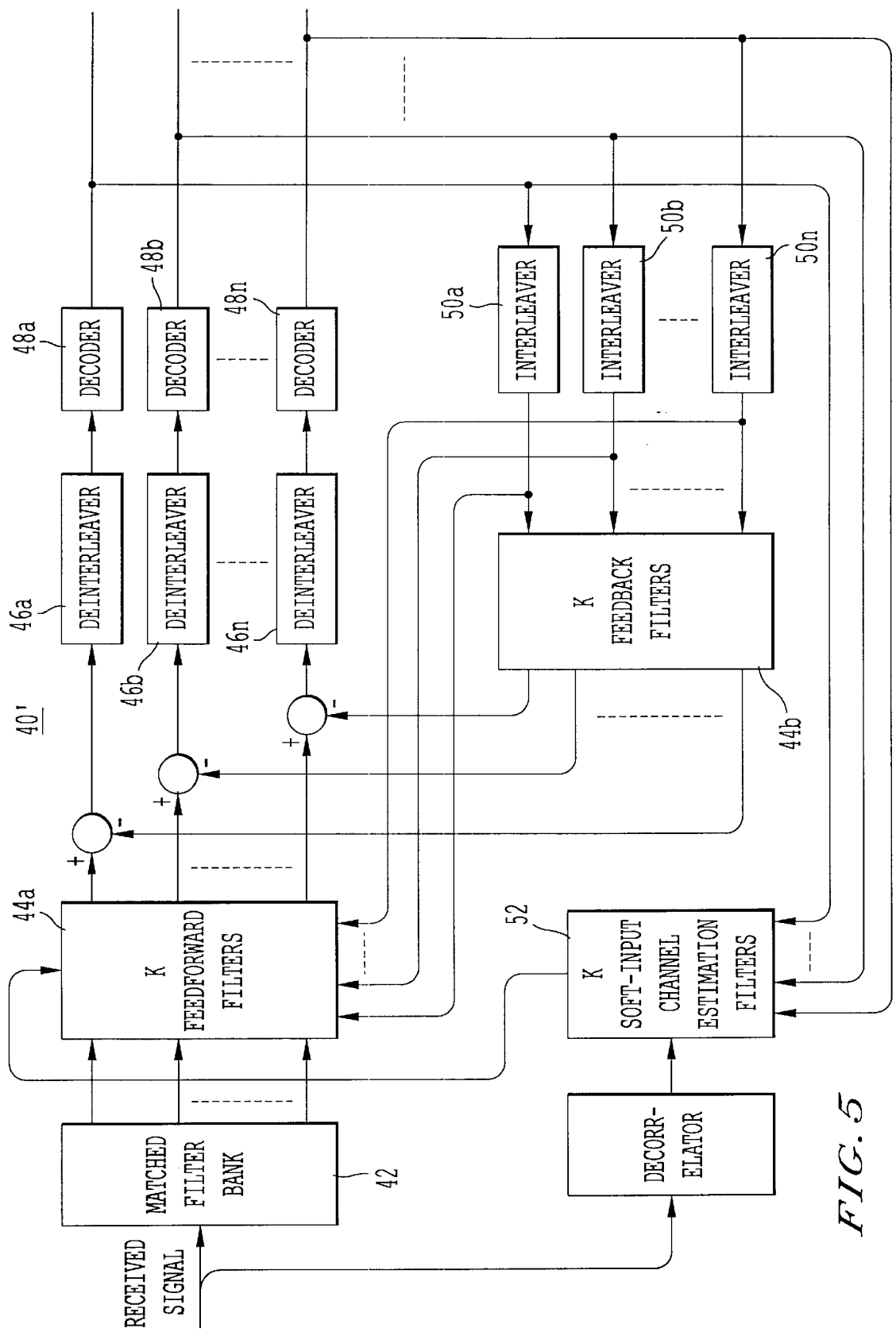
FIG. 5 is a block diagram of a receiver constructed in accordance with an embodiment of the present invention.

In this scheme, the SISO multi-user detection module 44 is based on the MMSE criterion. After each decoding iteration via 48a through 48n, the soft outputs are used to update the a-priori probabilities of the transmitted symbols. These updated probabilities are then used to calculate the MMSE filter feed-forward and feedback weights in the multi-user detection module, as indicated at 44a and 44b, respectively, in FIG. 5. The feedback connections 44b represent the subtractive interference cancellation part of the receiver, while the feed-forward weights 44a serve to suppress any residual interference.

The set of equations describing the filter coefficients used for generating the soft decision statistic corresponding to $c_t^i$ will be derived. The subscript t is omitted for convenience. Hence, the MMSE estimate y(i) of the i-th antenna symbol at time t is given by $$y^{(i)} = \underline{w}_f^{(i)T} \underline{r} + w_b^{(i)} \quad (10)$$

where $\underline{w}_f^{(i)}$ is the m×1 optimized feed-forward coefficients vector and $w_b^{(i)}$ is a single coefficient that represents the soft cancellation part. $\underline{w}_f^{(i)}$, $w_b^{(i)}$ are obtained through minimizing the mean square value of the error $$e = E[|y^{(i)} - c^{(i)}|^2]$$

between the data symbol and its estimate. Hence $$e = E\left[\left|\underline{w}_f^{(i)T} \underline{r} + w_b^{(i)} - c^{(i)}\right|^2\right] \quad (11)$$

-continued $$= E\left[\left|\underline{w}_f^{(i)T}\{\underline{S}^{(i)}c^{(i)} + S^{(n/i)}\underline{c}^{(n/i)} + \underline{n}\} + w_b^{(i)} - c^{(i)}\right|^2\right]$$

where $\underline{S}^{(i)}$ is the m×1 complex signature vector of the $i^{th}$ transmit antenna; $S^{(n/i)}$ is the m×(n−1) matrix composed of the complex signature vectors of the other n−1 transmit antennas 18; $\underline{c}^{(n/i)}$ is the (n−1)×1 transmitted data vector from the other n−1 transmit antennas 18. Using standard minimization techniques, it is easily shown that the MMSE solutions for $\underline{w}_f^{(i)}$, and $w_b^{(i)}$ satisfy the relations:

$$\underline{w}_f^{(i)T}S^{(n/i)}E[\underline{c}^{(n/i)}]+w_b^{(i)}=0 \tag{12}$$

$$\underline{w}_f^{(i)T}\{\underbrace{\underline{S}^{(i)}\underline{S}^{(i)H}}_{\underline{S}^{(i)T}}+S^{(n/i)}E[\underline{c}^{(n/i)}\underline{c}^{(n/i)T}]S^{(n/i)H}+E[\underline{nn}^H]\}+S^{(n/i)}E[\underline{c}^{(n/i)}]w_b^{(i)}= \tag{13}$$

where $$E[\underline{nn}^H]=N_0 I_{m\times m} \tag{14}$$

$$E[\underline{c}^{(n/i)}]=\underline{\tilde{c}}^{(n/i)} \tag{15}$$

At this point, statistical independence is assumed once again. This assumption is justified through the different interleaving used by each transmit antenna 18. Then $$E[\underline{c}^{(n/i)}\underline{c}^{(n/i)T}]=I_{(n-1)\times(n-1)}-\text{Diag}(\underline{\tilde{c}}^{(n/i)}\underline{\tilde{c}}^{(n/i)T})+\underline{\tilde{c}}^{(n/i)}\underline{\tilde{c}}^{(n/i)T} \tag{16}$$

Here $I_{m\times m}$ is the identity matrix of order m; $\underline{\tilde{c}}^{(n/i)}$ is the (n−1)×1 vector of the expected values of the transmitted symbols from the other n−1 antennas. The a-priori probabilities used to evaluate these expected values are obtained from the previous decoding iteration soft outputs, through the component-wise relation (9).

To simplify notation, the following definitions are made:

$$A=\underline{S}^{(i)}\underline{S}^{(i)H} \tag{17}$$

$$B=S^{(n/i)}[I_{(n-1)\times(n-1)}-\text{Diag}(\underline{\tilde{c}}^{(n/i)}\underline{\tilde{c}}^{(n/i)T})+\underline{\tilde{c}}^{(n/i)}\underline{\tilde{c}}^{(n/i)T}]S^{(n/i)H} \tag{18}$$

$$F=S^{(n/i)}\underline{\tilde{c}}^{(n/i)} \tag{19}$$

$$R_n=N_0 I_{m\times m} \tag{20}$$

Solving (12) and (13) for the optimum filter feed-forward and feedback coefficients, the following coefficients are obtained $$\underline{w}_f^{(i)T}=\underline{S}^{(i)H}(A+B+R_n-FF^H)^{-1}. \tag{21}$$

$$w_b^{(i)}=-\underline{w}_f^{(i)T}F. \tag{22}$$

The log-likelihood ratio is now given by $$L^{(i)}=\text{Re}(w_f^{(i)T}\underline{r}+w_b^{(i)}). \tag{23}$$

In the first decoding iteration, the transmitted symbols are assumed to have a uniform distribution; hence, $\underline{\tilde{c}}^{(n/i)}=\underline{0}$. The feed-forward filter coefficients vector, $\underline{w}_f^{(i)}$, in this iteration is given by similar relations to MMSE equations derived the real domain. The relations of the present invention, however, are in the complex domain because of the complex spreading codes, and the feedback coefficient $w_b^{(i)}=0$. After each iteration, $\underline{\tilde{c}}^{(n/i)}$ are recalculated using the decoders soft outputs. $\underline{\tilde{c}}^{(n/i)}$ are then used to generate the new set of filter coefficients as described. In the asymptotic case, when $|\underline{\tilde{c}}^{(n/i)}|=\underline{1}$, the receiver is equivalent to the subtractive interference canceler. This is expected, since $|\underline{\tilde{c}}^{(n/i)}|=\underline{1}$ means that the previous iteration decisions, for the other antenna symbols, are error free. Under this assumption, the subtractive interference canceler becomes the optimum solution.

The direct implementation of the receiver 16 employing iterative MMSE requires a complexity of polynomial order in the number of transmit antennas 18. Adaptive techniques can be used to reduce implementation complexity.

2.2.3 Iterative Soft Interference Cancellation

The main source of complexity in the iterative MMSE approach is the matrix inversion operation required to compute the filter feed-forward coefficients (21). This observation motivates the following suboptimal approach. $y^{(i)}$ can be rewritten as $$y^{(i)}=w_f^{(i)T}[\underline{r}-S^{(n/i)}\underline{\tilde{c}}^{(n/i)}]. \tag{24}$$

Then, if the matched filter $w_f^{(i)T}=[\alpha_{i1}^*,\ldots,\alpha_{im}^*]$ is used, the need for the matrix inversion operation in (??) is eliminated. The resulting receiver has a linear complexity, per iteration, in the number of transmit antennas.

2.2.4 Trade-Offs

The receiver 16 employing iterative MAP offers a substantial reduction in complexity compared to the optimal receiver, but its complexity is exponential and could be prohibitive for systems with medium to large numbers of antennas. The receiver 16 employing iterative MMSE has polynomial complexity. The soft interference cancellation method is the least complex.

The receiver 16 employing iterative MMSE has an important advantage over the other two iterative approaches in that it can suppress the interference from other space-time users without the need to decode all of the signals. In the iterative MAP and the soft interference cancellation techniques, undecoded signals are treated as white Gaussian noise. Hence, both approaches can have a near-far problem from undecoded space-time users. In the iterative MMSE, the other users' interference can be suppressed by the feed-forward filter coefficients without the need to actually decode the other users' signals. Prior knowledge of the other users' spreading codes, that is, path gains, is needed; although, an adaptive algorithm based on a combination of iterative cancellation and adaptive subspace projection can be used.

2.3 Application to Layered Space-Time Architectures

The iterative multi-user techniques can be implemented for either of the layered or multilayered transmission formats described above provided that the transmitter 18 is modified so that the output of each channel encoder 20 is interleaved independently before transmission. The principal advantages of the iterative techniques in both settings are briefly discussed below. In Section 3, a generalized layered architecture with optimized channel coding is presented that more effectively exploits the diversity available in the system 10.

2.3.1 Layered Architecture

The iterative techniques of the present invention offer several advantages over the detection technique proposed in the LST. First, unlike LST, neither iterative approach requires that m≧n. Second, the probability of error propagation is reduced in the presented algorithms through the feedback of soft information instead of hard decisions. More importantly, the iterative approach of the present invention strives to suppress interference from other layers with minimal loss in achieved diversity order. Therefore, these techniques achieve a better performance than LST.

Assuming error-free feedback, the capacity of the LST with m=n is $$C_{LB} = \sum_{k=1}^{m} \log_2[1 + (\rho/n)\chi_{2k}^2] \quad (25)$$

where p is the signal-to noise ratio at the input of each receive antennas, and $\chi_{2k}^2$ are independent chi-squared random variables with 2k degrees of freedom. The lower bound converges at high enough signal-to-noise ratios to the actual system capacity, so that LST achieves capacity asymptotically.

With the proposed iterative multi-user detection algorithms of the present invention, the ideal performance under error-free feedback is close to the upper bound $$C_{UB} = n \log_2[1 + (\rho/n)\chi_{2m}^2]. \quad (26)$$

At low signal-to noise ratios, the difference between the two bounds is considerable, indicating the superiority of the iterative techniques at small to medium signal-to noise ratios. The simulation results in Section 5 show that the iterative MMSE receiver 16 achieves more than 3 dB gain over the LST detection algorithm at 1% frame error rate.

2.3.2 Multi-Layered Architecture

The main advantage of the existing multi-layered scheme over the existing BLAST architecture is the use of space-time component codes rather than conventional channel codes. Space-time codes have the advantage of exploiting the diversity provided by the multiple transmit antennas but have the disadvantage that the complexity of the ML decoder is exponential in the number of transmit antennas used by each component code. The design of space-time codes for use in conjunction with the proposed iterative MAP and MMSE detection algorithms, however, is made more complicated by the use of independent interleaving of each antenna transmission. Random interleaving applied to each antenna stream may reduce the diversity advantage achieved by the space-time code. In the case of the space-time trellis codes, it appears a difficult task to verify that an interleaved version would still achieve full spatial diversity since the codes are handcrafted. A straightforward method has been proposed for analyzing the original codes and demonstrating that they achieve full spatial diversity, but the method is not readily extensible to the interleaved case. No systematic method for designing interleaved versions that retain full spatial diversity is known.

The iterative MAP and MMSE algorithms of the present invention can be applied, however, to the algebraic space-time code designs for BPSK or QPSK modulation. Assume BPSK transmission and a fixed code rate 1/n' where n' divides n. The input stream is divided into n/n' streams. Each stream is then independently encoded using the natural space-time code produced by a rate 1/n' convolutional encoder. The generator polynomials for full spatial diversity codes of this type are listed in Table I in Ser. No. 09/397,896, for different code constraint lengths and numbers of transmit antennas n' 18. Each output arm from each encoder is independently interleaved and transmitted from a different antenna. In order to ensure that the resulting space-time code retains full spatial diversity, it is enough to verify that the generator matrices corresponding to the interleaved branches of the convolutional code satisfy the stacking construction condition in Theorem 3. A random search strategy is very efficient in finding interleavers that satisfy the stacking construction.

The direct computation of the diversity order d achieved by the soft iterative decoder is a daunting task. Heuristically, the approximate bounds are as follows:

$$n'(m-n+1) < d < n'm. \quad (27)$$

The upper bound corresponds to the maximum diversity achievable by a single space-time component code using n' transmit antennas assuming ML decoding in the absence of competing transmissions from the other component codes on the remaining antennas (the ideal case). The lower bound corresponds to the diversity achieved by a receiver that uses zero-forcing to detect the signal transmitted from its antennas (assuming m≧n) and ML component decoders. Its use as an approximate lower bound for the iterative techniques is justified by the fact that the iterative MMSE receiver 16 with a single iteration achieves the same asymptotic performance at high signal-to-noise ratios as the zero-forcing receiver and should outperform the zero-forcing receiver at low signal-to-noise ratios since the MMSE criterion seeks to maximize total signal-to-noise-and-interference ratio. The bound also applies to the iterative MAP algorithm since it outperforms the MMSE technique.

Guided by the excellent performance of the iterative MMSE receiver in CDMA applications, the achieved diversity is close to the upper bound of n'm. The approximate bounds are compared to the 2(m−n+2) diversity advantage achieved by the joint trellis space-time coding and group interference suppression.

The architecture just described suffers from two main drawbacks. First, it is not applicable to arbitrary constellation. This is due to the limited applicability of the binary rank criteria to BPSK and QPSK constellations. Second, it does not efficiently exploit the temporal diversity embedded in the block fading channel. These limitations are avoided in the new approach presented in the next section.

3. The Threaded Space-Time Approach

Figure 6:
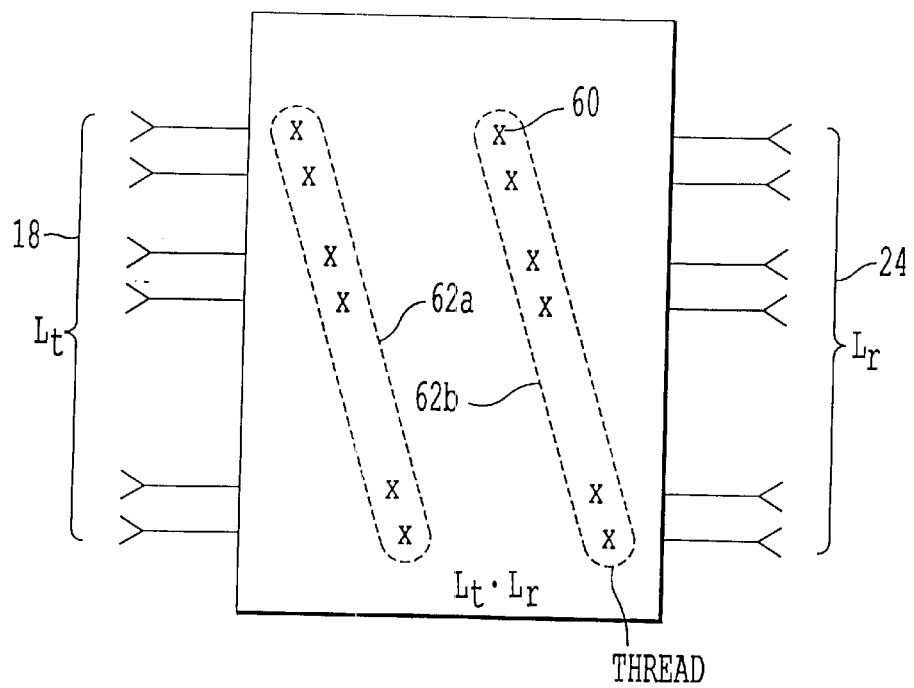
FIG. 6 illustrates a threaded code word matrix constructed using a threaded space-time architecture in accordance with an embodiment of the present invention.

In this section, a generic approach for space-time transmitter/receiver design is presented in accordance with the present invention which combines efficient algebraic code design with iterative multi-user detection. In the proposed approach, an input data stream is divided into multiple threads. Each thread is encoded and interleaved separately. At each point of time, only one symbol 60 is transmitted from each thread 62, as shown in FIG. 6. At the receiver 16, the iterative multi-user detector serves to separate the different threads 62a, 62b, and so on with minimal loss in performance. The encoding, interleaving, and distribution of thread symbols among different antennas is optimized to maximize spatial diversity, temporal diversity, and coding gain for a given transmission rate, assuming no interference from the other threads. Meanwhile, interleaving is performed in such a way to maximize the efficiency of the iterative receiver. While threads can be presented by a diagonal in the matrix 64, as depicted in FIG. 6, the symbols in a thread need not be transmitted by adjacent antennas in respective symbol transmission intervals.

3.1 Threaded Space-Time Architecture

As in the generic layered architecture, the transmitter has available a disjoint set of layers, L={$L_1, L_2, \ldots, L_n$}, and transmits the composite code word $\gamma(\underline{u})=\gamma_1(\underline{u}_1)|\gamma_2(\underline{u}_2)| \ldots |\gamma_n(\underline{u}_n)$ by sending $\gamma_i(\underline{u}_i)$ in layer $L_i$.

The layer set L is designed so that each layer is active during all of the available symbol transmission intervals and, over time, uses each of the n antennas equally often. Thus, during each symbol transmission interval, the layers each transmit a symbol using a different antenna; and, in terms of antenna usage, all of the layers are equivalent. A layer satisfying these constraints is referred to as a thread of spatial span n. The simplest example of threaded layering of temporal span l is the set L in which $$L_i = \{\lfloor t+i-1 \rfloor_n + 1, t): 0 \leq t < l\}. \quad (28)$$

Unlike the layered architectures of described above, the design approach of the present invention treats the coded transmission in each layer as a bona fide space-time code, constructions for which are given in the next section. Looking at the space-time coding performed on a single layer in isolation, this construction appears to reduce throughput as a result of silence periods imposed on the different antennas; however, in the overall threaded transmission scheme, the silent periods on antennas that are not used by a given layer are filled with the transmissions from the other component space-time codes. Signal processing at the receiver, which is necessary to remove or suppress spatial interference among the threaded layers, allows high throughput to be achieved. One innovation of the new architecture is that, under the assumption of error-free interference cancellation, the component space-time codes can be designed to achieve full spatial diversity without degradation in overall system throughput.

The space-time architecture of the present invention is not a multi-layer approach since the transmit positions occupied by the modulated code symbols for a particular thread constitute a single layer. Yet, the architecture of the present invention is not a layered architecture in the same sense as the BLAST architecture. This is because the threaded layering is a more general type of layering well-suited for iterative multi-user techniques, and the channel coding design in the new approach is two-dimensional based on space-time coding principles designed to exploit both the spatial and temporal diversity. To distinguish this new approach, the architecture of the present invention is referred to as the threaded space-time (TST) architecture. The three architectures are compared in more detail in Section 4 below.

The efficiency of the threaded architecture depends on the ability of the receiver to eliminate the interference coming from the other space-time component codes. In principle, any multi-user detection technique can be used in this context. The iterative MMSE receiver is used in accordance with the present invention because of its reasonable complexity and its ability to achieve performance close to the interference-free scenario under different conditions. This approach is applicable to arbitrary constellations with binary (or non-binary) codes.

3.2 Design of Threaded Space-Time Codes

In this section, the design of the component space-time codes used in the threaded architecture is discussed. The design of these codes follows an algebraic approach introduced in the above-referenced application Ser. No. 09/397, 896. The layering provided by the threaded architecture allows the algebraic formulation to be extended to arbitrary signalling constellations. Importantly, the requirement for independent interleaving in the iterative multi-user receiver is easily accommodated in these code designs.

Consider a single threaded layer $L_i$ and the corresponding component space-time code $C_i$ associated with encoder $\gamma_i$. The spatially modulated code words of $C_i$ are the $n \times (N/b)$ complex matrices $f_i(\gamma_i(\underline{u}_i))$. To simplify notation, the indices are not used, letting $L=L_i$, $C=C_i$, and $g=\gamma_i$. Let $f_L$ denote the component spatial modulator function associated with layer L. Unsubscripted vectors such as $\underline{x}$ or $\underline{y}$ are used herein to refer to the information stream.

For the design of the space-time code C associated with thread L, the following stacking construction using binary matrices for the quasi-static fading channel is employed.

Theorem 4 (Threaded Stacking Construction) Let L be a threaded layer of spatial span n. Given binary matrices $M_1$, $M_2, \ldots, M_n$ of dimension $k \times bl$, let C be the binary code of dimension k consisting of all code words of the form $g(\underline{x}) = \underline{x}M_1 | \underline{x}M_2 | \ldots \underline{x}M_n$, where $\underline{x}$ denotes an arbitrary k-tuple of information bits. Let $f_L$ denote the spatial modulator having the property that $\mu(\underline{x}M_i)$ is transmitted in the l symbol intervals of L that are assigned to antenna i.

Then, as the space-time code in a communication system with n transmit antennas and m receive antennas, the space-time code C consisting of C and $f_L$ achieves spatial diversity dm in a quasi-static fading channel if and only if d is the largest integer such that $M_1, M_2, \ldots, M_n$ have the property that $$\forall a_1, a_2, \ldots, a_n \in \mathbb{F}, a_1 + a_2 + \ldots + a_n = n-d+1:$$

$M = [a_1 M_1 a_2 M_2 \ldots a_n M_n]$ is of rank k over the binary field.

Proof: Due to the lack of spatial interference within a layer, the baseband rank criterion is straightforward to apply. In particular, note that the baseband difference $f_L(g(\underline{x})) - f_L(g(\underline{y}))$ has rank d if and only if it has precisely d non-zero rows.

Now suppose that, for some $a_1, a_2, \ldots, a_n \in \mathbb{F}$ satisfying $a_1 + a_2 + \ldots + a_n = n-d+1$, then $M = [a_1 M_1 a_2 M_2 \ldots a_n M_n]$ is singular. Then, there exist $\underline{x}, \underline{y} \in \mathbb{F}^k$, $\underline{x} \neq \underline{y}$, such that $\underline{x}M = \underline{y}M$. In this case, $f_L(g(\underline{x})) - f_L(g(\underline{y}))$ has an all-zero row for every non-zero coefficient $a_i$. Since there are n−d+1 non-zero coefficients, $f_L(g(\underline{x})) - f_L(g(\underline{y}))$ has rank less than d. Thus, C does not achieve dm-level diversity.

Conversely, suppose C does not achieve dm-level diversity. Then, there exist $\underline{x}, \underline{y} \in \mathbb{F}^k$, $\underline{x} \neq \underline{y}$, such that the baseband difference $f_L(g(\underline{x})) - f_L(g(\underline{y}))$ has rank less than d. It must therefore have at least n−d+1 all-zero rows. Let I denote a set of indices for n−d+1 such rows, and set $a_i=1$ for $i \in I$ and $a_i=0$ otherwise. Then, the matrix $M = [a_1 M_1 a_2 M_2 \ldots a_n M_n]$ is singular since $\underline{x}M = \underline{y}M$.

Corollary 5 Full spatial diversity nm is achieved if and only if $M_1, M_2, \ldots, M_n$ are of rank k over the binary field.

A space-time code that achieves dm-level spatial diversity in a communication system with n transmit and m receive antennas over the quasi-static fading channel is called a d-space-time code.

Corollary 6 The maximum transmission rate for a communication system using the threaded layering architecture with n transmit antennas, a signaling constellation of size $2^b$, and component codes achieving d-level transmit spatial diversity constellation is b(n−d+1) bits/sec/Hz.

Proof: By Theorem 4, in order for the code to achieve d-level spatial diversity, the number of columns in $M_j$ must satisfy $bl \geq k/(n-d+1)$. Then the code rate for C is $k/(nbl) \leq (n-d+1)/n$. Therefore, the maximum transmission rate of each thread is $br \leq b(n-d+1)/n$ bits per signaling interval. Then, the total transmission rate of the n threads is b(n−d+1). A different proof can be obtained using the maximum lossless compression transmission rate.

The following result is facilitates the design of space-time threaded codes that allow for exploiting the temporal diversity and maximizing the efficiency of the iterative multi-user detector.

Theorem 7 Let C be a d-space-time code consisting of the binary code C whose code words are of the form $g(\underline{x}) = \underline{x}M_1 | \underline{x}M_2 | \ldots | \underline{x}M_n$, where $\underline{x}$ denotes an arbitrary k-tuple of information bits, and the spatial modulator $f_L$ in which $\underline{x}M_i$ is assigned to antenna i along threaded layer L. Given the linear vector-space transformations $T_1, \ldots, T_n: \mathbb{F}^{bl} \to \mathbb{F}^p$, a new space-time code is constructed by assigning $T_i(\underline{x}M_i)$ to antenna i along threaded layer L. Then, the new space time code achieves the same spatial diversity order dm if $T_1, \ldots, T_n$ are nonsingular.

In particular, the linear transformation $T_i$ of the previous theorem is an arbitrary permutation $\pi_i$. Then, the interleaved space-time code resulting from assigning $\pi_i(\underline{x}M_i)$ to antenna i along threaded layer L achieves the same level of diversity as the non-interleaved space-time code C.

Consider the special case of designing space-time trellis codes for the threaded architecture. The natural space-time codes discussed in application Ser. No. 09/397,896 and associated with binary, rate 1/n, convolutional codes with periodic bit interleaving are attractive candidates for the threaded space-time architecture as they can be easily formatted to satisfy the threaded stacking construction. Each output arm from the encoder is transmitted from a separate antenna. There is no restriction on the interleaving employed by each antenna (i.e, different interleaving can be used by the different antennas without violating the generalized stacking condition). As discussed earlier, this feature allows for the design of efficient iterative multi-user receivers. These convolutional codes can be used for a similar application, that is, the block erasure channel. The main advantage of such codes is the availability of computationally efficient, soft-input/soft-output decoding algorithms.

For space-time trellis codes treats, only the case in which the underlying code has rate 1/n matched to the number of transmit antennas has been considered. For the threaded space-time code design of the present invention, the more general case in which the convolutional code has rate greater than 1/n is used. The treatment includes the case of rate k/n convolutional codes constructed by puncturing an underlying rate 1/n convolutional code.

Let C be a binary convolutional code of rate k/n. The encoder processes k binary input sequences $\underline{x}_1(t)$, $\underline{x}_2(t), \ldots, \underline{x}_k(t)$ and produces n coded output sequences $y_1(t)$, $y_2(t), \ldots, y_n(t)$ which are multiplexed together to form the output code word.

For quasi-static fading channels, the input and output sequences of interest are of fixed finite length. In the more general case, however, the sequences are semi-infinite indexed by $t=0, 1, 2, \ldots$ Let $\mathbb{F}^\infty$ denote the space of all such binary sequences. A sequence $\{\underline{x}(t)\}_{t=0}^\infty \in \mathbb{F}^\infty$ is often represented by the formal series $X(D)=\underline{x}(0)+\underline{x}(1)D+\underline{x}(2)D^2+\ldots$ Refer to $\{\underline{x}(t)\} \leftrightarrow X(D)$ as a D-transform pair. The space $\mathbb{F}[[D]]$ of all formal series is an integral domain whose invertible elements are those that are not multiples of D.

The action of the binary convolutional encoder is linear and is characterized by the so-called impulse responses $g_{i,j}(t) \leftrightarrow G_{i,j}(D)$ associating ouput $y_j(t)$ with input $\underline{x}_i(t)$. Specifically, $$y_j(t)=x_1(t)*g_{1,j}(t)+x_2(t)*g_{2,j}(t)+\ldots+x_k(t)*g_{k,j}(t),$$

where * denotes discrete convolution. Then the D-transform of the j-th output of the convolutional encoder is given by $$Y_j(D)=X_1(D)G_{1,j}(D)+X_2(D)G_{2,j}(D)+\ldots+X_k(D)G_{k,j}(D).$$

Thus, the encoder action is summarized by the matrix equation $$Y(D)=X(D)G(D),$$

where $Y(D)=[Y_1(D)\ Y_2(D)\ \ldots\ Y_n(D)]$, $X(D)=[X(D)\ X_2(D) \ldots X_k(D)]$, and $$G(D) = \begin{bmatrix} G_{1,1}(D) & G_{1,2}(D) & \cdots & G_{1,n}(D) \\ G_{2,1}(D) & G_{2,2}(D) & \cdots & G_{2,n}(D) \\ \vdots & \vdots & \ddots & \vdots \\ G_{k,1}(D) & G_{k,2}(D) & \cdots & G_{k,n}(D) \end{bmatrix}$$

Consider the natural space-time formatting of C in which the output sequence corresponding to $Y_j(D)$ is assigned to the j-th transmit antenna. Characterize the spatial diversity that can be achieved by this scheme. A preferred algebraic analysis technique considers the rank of matrices formed by concatenating the column vectors $$F_l(D) = \begin{bmatrix} G_{1,l}(D) \\ G_{2,l}(D) \\ \vdots \\ G_{n,l}(D) \end{bmatrix}.$$

Specifically, for $a_1, a_2, \ldots, a_n \in \mathbb{F}$, let $$F(a_1,a_2,\ldots,a_n)=[a_1F_1 a_2F_2 \ldots a_nF_n].$$

Then the following theorem relating the spatial diversity of the space-time code C in the quasi-static fading channel to the rank of these matrices over $\mathbb{F}[[D]]$ is considered.

Theorem 8 Let C denote the threaded space-time code consisting of the binary convolutional code C, whose k×n transfer function matrix is $G(D)=[F_1(D)\ F_2(D) \ldots F_n(D)]$, and the spatial modulator $f_L$ in which the output $Y_j(D)=X(D)\cdot F_j(D)$ is assigned to antenna j along threaded layer L. Let v be the smallest integer having the property that, whenever $a_1+a_2+\ldots+a_n=v$, the k×n matrix $F(a_1, a_2, \ldots, a_n)$ has full rank k over $\mathbb{F}[[D]]$. Then the space-time code C achieves d-level spatial transmit diversity over the quasi-static fading channel where $d=n-v+1$ and $v \geq k$.

Proof: All of the code words of C are of the form $Y^T(D)=G^T(D)X^T(D)$. Under the stipulated conditions of the theorem and following the argument of Theorem ?? (threaded stacking construction), only the all-zero code word has v or more all-zero rows, so the spatial transmit diversity of C is at least $n-v+1$. On the other hand, since v is the smallest integer having the stated property, there is some information sequence $X(D)$ resulting in a code word with $v-1$ all-zero rows. Hence, the spatial transmit diversity of C is precisely $n-v+1$.

Rate 1/n' convolutional codes with n'<n can also be put into this framework. Let C be a binary convolutional code with transfer function matrix $$G(D)=[G_0(D)G_1(D)\ldots G_{n'-1}(D)].$$

The coded bits are to be distributed among n transmit antennas. For simplicity, consider the case in which s=n/n' is an integer and the coded bits are assigned to the antennas periodically. Thus, for each of the coded bit streams $Y_i(D) \leftrightarrow \{y_i(t)\}$, the subsequence $y_i(0), y_i(s), y_i(2s), \ldots$ is assigned to antenna si; the subsequence $y_i(1), y_i(s+1), y_i(2s+1), \ldots$ is assigned to antenna si+1; and so on. Alternate assignments such as symbol based demultiplexing would also be possible and can be analyzed using the same framework.

In general, partition the series $X(D)$ corresponding to $\{x(t)\}$ into its modulo s components $X_j(D)$ corresponding to the subsequences $\{x(st+j)\}_{t=0}^\infty (j=0, 1, 2, \ldots, s-1)$. Then $$X(D)=X_0(D^s)+D\cdot X_1(D^s)+\ldots+D^{s-1}\cdot X_{s-1}(D^s).$$

Similarly, partition $G_i(D)$ into components $G_{i,j}(D)$ and $Y_i(D)$ into components $Y_{i,j}(D)$. The space-time code C under consideration therefore consists of the binary code C together with a spatial modulator function in which $Y_{i,j}(D)$ is assigned to antenna si+j.

By multiplying the expansions for X(D) and $G_i(D)$ and collecting terms, it can be shown that the coded bit stream assigned to antenna si+j is given by $$Y_{i,j}(D) = \sum_{k=0}^{s-1} X_k(D) F_{si+j,k}(D),$$

where $$F_{si+j,k}(D) = G_{i,j-k}(D) + D \cdot G_{i,j-k+s}(D).$$

In matrix form, $$Y_{i,j}(D) = X(D) F_{si+j}(D),$$

which is the dot product of row vector $X(D) = [X_0(D)\ X_1(D) \ldots X_{s-1}(D)]$ and column vector $$F_{si+j}(D) = \begin{bmatrix} F_{si+j,0}(D) \\ F_{si+j,1}(D) \\ \vdots \\ F_{si+j,s-1}(D) \end{bmatrix}.$$

The theorem now applies directly. The spatial transmit diversity achieved by C is given by d=n−v+1, where v is the smallest integer having the property that, whenever $a_0 + a_1 + \ldots + a_{n-1} = v$, the s×n matrix $F(a_0, a_1, \ldots, a_{n-1})$ has full rank s. In particular, the best possible spatial transmit diversity is d=n−s+1. When n'=n, s=1 so that full spatial transmit diversity d=n is possible as expected.

Example. Consider the optimal $d_{free}=5$ convolutional code with generators $G_0(D)=1+D^2$ and $G_1(D)=1+D+D^2$. In the case of two transmit antennas, it is clear that the natural threaded space-time code achieves d=2 level diversity.

In the case of four transmit antennas, note that the rate ½ code can be written as a rate ¼ convolutional code with generator matrix:

$$G(D) = \begin{bmatrix} 1+D & 0 & 1+D & 1 \\ 0 & 1+D & D & 1+D \end{bmatrix}.$$

By inspection, every pair of columns is linearly independent over $\mathbb{F}[[D]]$. Hence, the natural periodic distribution of the code across four transmit antennas produces a threaded space-time code achieving the maximum d=3 transmit spatial diversity.

For six transmit antennas, express the code as a rate ³⁄₆ code with generator matrix:

$$G(D) = \begin{bmatrix} 1 & 0 & 1 & 1 & 1 & 1 \\ D & 1 & 0 & D & 1 & 1 \\ 0 & D & 1 & D & D & 1 \end{bmatrix}.$$

Every set of three columns in the generator matrix has full rank over $\mathbb{F}[[D]]$, so the natural space-time code achieves maximum d=4 transmit diversity.

Thus far, the design of threaded space-time codes that exploit the spatial diversity over quasi-static fading channels has been considered. One of the advantages of the threaded architecture, however, is its ability to jointly exploit the spatial diversity, provided by the multiple transmit and receive antennas, and the temporal diversity, provided by the time variations in the block fading channel. In fact, the results obtained for threaded space-time code design for the quasi-static fading channel are easily extended to the more general block fading channel.

In the absence of interference from other threads, the quasi-static fading channel under consideration can be viewed as a block fading channel with receive diversity, where each fading block is represented by a different antenna. For the threaded architecture with n transmit antennas and a quasi-static fading channel, there are n independent and non-interfering fading links per code word that can be exploited for transmit diversity by proper code design. In the case of the block fading channel, there is a total of nB such links, where B is the number of independent fading blocks per code word per antenna. Thus, the problem of block fading code design for the threaded architecture is addressed by simply replacing parameter n by nB.

For example, the following "multi-stacking construction" is a direct generalization of Theorem 4 to the case of a block fading channel.

Theorem 9 (Threaded Multi-Stacking Construction) Let L be a threaded layer of spatial span n. Given binary matrices $M_{1,1}, M_{2,1}, \ldots, M_{n,1}, \ldots, M_{1,B}, M_{2,B}, \ldots, M_{n,B}$ of dimension k×l, let C be the binary code of dimension k consisting of all code words of the form $$g(\underline{x}) = \underline{x}M_{1,1}|\underline{x}M_{2,1}| \ldots |\underline{x}M_{n,1}| \ldots |\underline{x}M_{1,B}|\underline{x}M_{2,B}| \ldots \underline{x}M_{n,B},$$

where $\underline{x}$ denotes an arbitrary k-tuple of information bits, and B is the number of independent fading blocks spanning one code word. Let $f_L$ denote the spatial modulator having the property that $\mu(\underline{x}M_{j,v})$ is transmitted in the symbol intervals of L that are assigned to antenna j in the fading block v.

Then, as the space-time code in a communication system with n transmit antennas and m receive antennas, the space-time code C consisting of C and $f_L$ achieves spatial diversity dm in a B-block fading channel if and only if d is the largest integer such that $M_{1,1}, M_{2,1}, \ldots, M_{n,B}$ have the property that $$\forall a_{1,1}, a_{2,1}, \ldots, a_{n,B} \in \mathbb{F}, a_{1,1} + a_{2,1} + \ldots + a_{n,B} = nB - d + 1$$

$M = [a_{1,1}M_{1,1}\, a_{2,1}M_{2,1} \ldots a_{n,B}M_{n,B}]$ is of rank k over the binary field.

Proof: This result is immediate from the equivalent quasi-static model with nB transmit antennas.

3.3 Performance Bound

In this section, the diversity advantage achieved by the threaded architecture when the iterative MMSE algorithm is used is investigated.

Proposition 10 Let C be a d-diversity code used in each thread in a setting with n transmit and m receive antenna, then the zero-forcing receiver achieves spatial diversity d'=d(m−n+1).

Proof: To detect the signal transmitted from the n-th antenna, the zero forcing receiver projects the received signal on the null space of $S^{(n/i)}$. Let $N_i$ be the null space of $S^{(n/i)}$, and $V_i$ be a (m−n+1)×m matrix whose rows are orthonormal vectors of $N_i$, then the (m−n+1)×1 output vector corresponding to $c_t^{(i)}$ is computed as $$\underline{y}_t^{(i)} = V_i \underline{r}_t = \underline{\tilde{S}}^{(i)} c_t^{(i)} + \underline{\tilde{n}}_t^{(i)}. \qquad (29)$$

The elements of $\underline{\tilde{S}}^{(i)}, \underline{\tilde{n}}_t^{(i)}$ are independent Gaussian random variables with $E\{\underline{\tilde{n}}^{(i)} \underline{\tilde{n}}^{(k)H}\} = 0$. Note that, in general $E\{\underline{\tilde{S}}^{(i)}$ $\underline{\tilde{S}}^{(k)}{}_H\} \neq 0$. Hence, at the output of the zero forcing filter, the channel is equivalent to an interference-free correlated block fading channel with n blocks and m−n+1 receive antennas. Since the different equivalent Gaussian fading gains are linearly independent, the channel correlation matrix is of full rank. Thus, the diversity order is d·(m−n+1).

Let $SIR_j^{(i)}$ denote the signal-to-interference-plus-noise ratio (SIR) for a symbol transmitted from the i-th antenna after the j-th iteration of the iterative MMSE algorithm. Then, conditioning on the set of path gains, $$SIR_j^{(i)} = \frac{E_s \|\underline{w}_j^T \underline{S}^{(i)}\|^2}{N_0 \|\underline{w}_j\|^2 + \sum_{k \neq i} E_s \|\underline{w}_j^T \underline{S}^{(k)}\|^2 (1 - \tilde{c}^{(k)})}, \quad (30)$$

where $\underline{w}_j$ is the vector of feed-forward filter coefficients used in the j-th iteration.

Proposition 11 Let C be a d-diversity code used in each thread in a setting with n transmit and m receive antenna. The SIR at the output of the iterative MMSE detector after j iterations is at least as large as the SIR after one iteration. Furthermore, output SIR is at least as large as that produced by the zero-forcing detector.

Proof: If $SNR_{zf}$ denotes the SIR at the output of the zero-forcing detector, then it follows from the definition of the MMSE receiver that $SNR_1^{(i)} \geq SNR_{zf}$. Also, from the definition of the MMSE filter, it follows that $$SIR_j^{(i)} \geq \frac{E_s \|\underline{w}_1^T \underline{S}^{(i)}\|^2}{N_0 \|\underline{w}_1\|^2 + \sum_{k \neq i} E_s \|\underline{w}_1^T \underline{S}^{(k)}\|^2 (1 - \tilde{c}^{(k)})}$$

$$\geq \frac{E_s \|\underline{w}_1^T \underline{S}^{(i)}\|^2}{N_0 \|\underline{w}_1\|^2 + \sum_{k \neq i} E_s \|\underline{w}_1^T \underline{S}^{(k)}\|^2}$$

$$= SIR_1^{(i)},$$

as was to be shown.

The output of the MMSE receiver can be tightly approximated by a Gaussian random variable in additive white Gaussian noise (AWGN) channels. In the space-time code setting, the channel is AWGN when conditioned on the path gains. Thus, the diversity advantage achieved by the iterative MMSE receiver for the threaded architecture is approximately lower bounded by the performance achieved by the zero-forcing receiver. Consequently, in a threaded architecture using d-space-time codes, the iterative MMSE receiver can achieve diversity d' satisfying $$d \cdot (m-n+1) \leq d' \leq dm. \quad (31)$$

This lower bound justifies the approach to code design for the threaded architecture in accordance with the present invention. In particular, the design criteria developed in Theorems 4 and 9 for optimizing the channel coding for each thread in the absence of interference also serves to maximize a lower bound on the diversity advantage when the iterative MMSE detector is used to mitigate the interference from other threads. The simulation results of Section 5 suggest that the lower bound is in fact a pessimistic estimate of the performance of the threaded architecture with iterative MMSE multi-user detection.

4. System Comparisons

A high-level comparison of the various architectures is shown in Table I below. As shown in the table, all of the transmission formats achieve comparable efficiency. Here, efficiency refers to the number of information symbols per vector channel use. For example, in the horizontal layering scheme, there are n layers each containing a code word of length lb and rate r. Thus, successful use of all transmission resources provides a total of n·(rlb) information symbols. Normalizing by the total number of symbol transmission intervals l gives an efficiency of nrb information symbols per transmitted symbol interval. For the diagonal-layering, the efficiency is somewhat less since the diagonal layers cannot utilize a portion of the transmission resources (the result in the table assumes the width of the diagonal w=1).

The diversity orders achieved by the various architectures in both quasi-static and block fading channels are also indicated in Table I. In the different approaches, the channel coding schemes are assumed to achieve the maximum possible diversity level for rate r codes. Since no attempt has been made to optimize the coding for the diagonal layering architecture, the results reported in the table are on a per-symbol basis. In the prior architectures, the diversity order is variable. Table I shows the range of values (minimum value:maximum value) and notes whether the variation is from layer to layer or from symbol to symbol. In the case of the threaded architecture, the diversity order is not variable in this way. Since the exact value is unknown, Table I gives upper and lower bounds. For the block fading channel, the parameter B denotes the number of fading blocks per code word.

The threaded layering is similar to V-BLAST in that each transmitted symbol in a thread is Subject to interference from n−1 other layers, but better spatial diversity is achieved through more efficient transmit diversity and multi-user detection signal processing. The threaded layering is similar to D-BLAST in that all of the transmit antennas are used equally by each component coded transmission. Threaded layering, however, more fully exploits the available temporal diversity since temporal interleaving is allowed across each transmit antenna. Furthermore, unlike D-BLAST, the threaded layering with space-time code design and iterative multi-user detection algorithms provide uniform spatial diversity from symbol to symbol. Unlike the horizontal multi-layering approach with group interference suppression, the threaded architecture provides uniform performance from one component space-time code to the next. Each component space-time code therefore can, under the ideal interference cancellation assumption, achieve full spatial and temporal diversity.

TABLE I

Comparison of Different Layered Architectures

| Architecture | Efficiency | Quasi-Static Fading Diversity | B-Block Fading Diversity |
|---|---|---|---|
| H-Layering | nrb | 1:m<br>Layer-to-layer | $\lfloor B1 - r \rfloor$ + 1:m ($\lfloor B1 - r \rfloor$ + 1)<br>Layer-to-layer |

TABLE I-continued

Comparison of Different Layered Architectures

| Architecture | Efficiency | Quasi-Static Fading Diversity | B-Block Fading Diversity |
| --- | --- | --- | --- |
| D-Layering | $nrb - \frac{n(n-1)rb}{l}$ | 1:m Symbol-to-symbol | 1:m Symbol-to-symbol |
| H-Multi-Layering | nrb | $\lfloor \frac{1}{r} \rfloor (m - n + \lfloor \frac{1}{r} \rfloor) : \lfloor \frac{1}{r} \rfloor m$ Layer-to-layer | — |
| Threaded | nrb | $(m - n + 1)(\lfloor n1 - r \rfloor + 1) \leq$ $d \leq m(\lfloor n1 - r \rfloor + 1)$ | $(m - n + 1)(\lfloor nB1 - r \rfloor + 1) \leq$ $d \leq m(\lfloor nB1 - r \rfloor + 1)$ |

5. Performance Comparisons

In this section, the performance of iterative multi-user detection applied to layered space-time architectures is investigated by means of simulation. The first study considers the conventional layered architecture and demonstrates the advantage of the iterative methods of the present invention over existing zero-forcing techniques. The second study looks at the threaded space-time architecture, in which the layering and channel coding are optimized for iterative multi-user detection, and demonstrates that significant performance improvements can be achieved by this new approach.

Throughout the simulation study rate ½ convolutional codes are used. The results are obtained by averaging the bit and frame error rates of all the component codes. The channel decoder is based on the soft output Viterbi algorithm (SOVA). The frame length is 100 bits. The iterative MMSE receiver is considered in more detail because it provides a compromise between complexity and performance among the three presented iterative receivers.

While, in essence no restrictions were imposed on the number of receive antennas, the performance of the threaded space-time architecture can be expected to degrade if m<<n. The reason is that in practice a reasonably large number of receive antennas is required to remove the interference. In the next section, it is shown that excellent performance can be achieved for the case of m=n, showing substantial gain over the group suppression multi-layering approach.

5.1 Layered Space-Time Architecture

Figure 7:
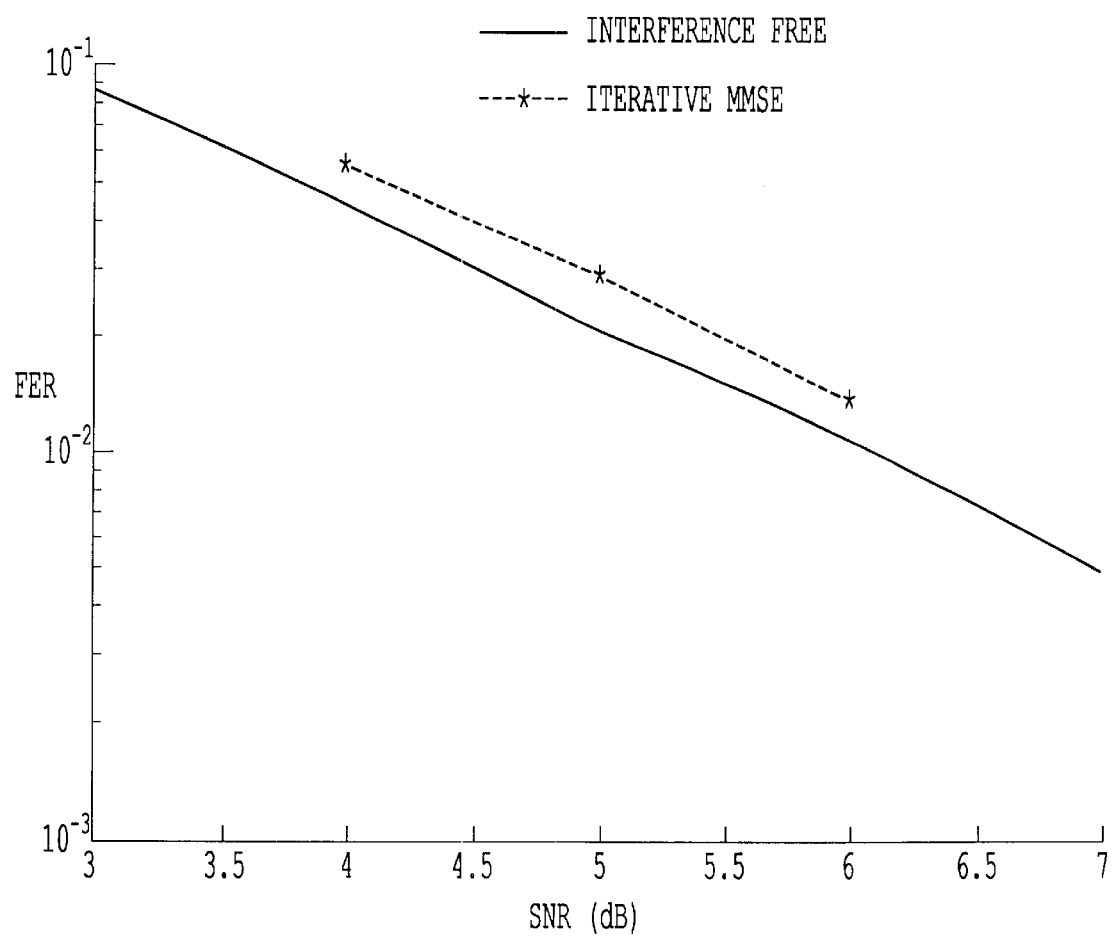
FIGS. 7 and 8 are graphs illustrating the performance of a receiver constructed in accordance with an embodiment of the present invention.

FIG. 7 illustrates the performance of the iterative MMSE receiver with single-dimensional channel codes. The number of transmit and receive antennas is 4 and the bandwidth efficiency of this system is 2 bits/sec/hz (i.e. BPSK modulation). For comparison purposes, a lower bound on the frame error rate of the LST approach is included, as well as the performance of the single user systems which assumes the presence of only one transmit antenna and 4 receive antennas. The LST lower bound assumes error-free decision feedback. The other bound is a lower bound on the performance achieved by the optimum receiver.

It can be seen that the performance of the proposed iterative MMSE receiver 40 is within a fraction of a decibel of the interference-free performance. This is 2 dB better than the best possible performance of LST. In fact, while the performance of the LST is expected to be close to the lower bound at high signal-to noise ratios, the bound is expected to be loose at low signal-to-noise ratio due to error propagation. Hence, the relative advantage of the iterative MMSE receiver is larger.

Figure 8:
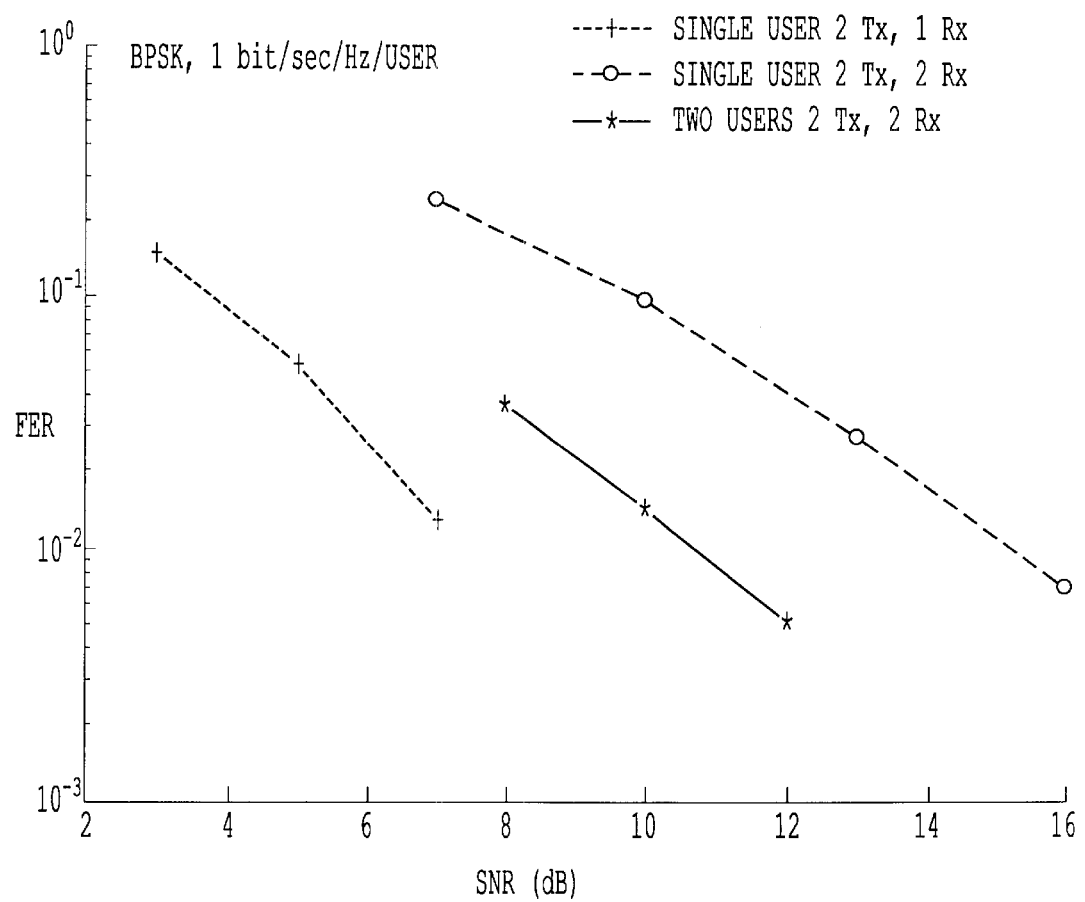

The combination of space-time codes with iterative decoding techniques can be even more potent. In FIG. 8, the performance of the combined space-time coding and iterative MMSE reception scheme (Iterative MMSE+STC) described above is illustrated where the output of each component convolutional code is distributed among two antennas. It is shown that this scheme provides a gain of about 1 dB over the iterative MMSE receiver combined with single dimensional coding. It is quite remarkable that this gain comes without any additional complexity at either the transmitter or the receiver. Overall, the gain provided by the combined architecture compared with the LST is more than 3 dB in this scenario. This gain increases with the number of antennas because of the superior ability of the present invention to exploit the diversity advantage provided by the multiple transmit and receive antennas.

FIG. 8 illustrates another advantage of the Iterative MMSE+STC scheme. In this figure, the case with 4 transmit and 2 receive antennas is considered. As discussed earlier, the LST receiver architecture cannot be used in this scenario because m<n. This system is equivalent to space-time multiple access channel with 2 space-time users. The two space-time users have equal energy and use two antennas for their transmission. It was been shown that with 2 receive antennas, the performance of this system is same as a space-time multiple access channel with one space-time user and one receive antenna using the interference cancellation technique (i.e, the second receive antenna is used to remove the interference of the other space-time user). To compare this result with the scheme of the present invention, the performance of 2 transmit/1 receive and 2 transmit/2 receive antennas which transmit 1 bit/sec/hz (i.e, equivalent to one space-time user) was also depicted in the Figure. It is shown that by jointly decoding the two space-time users, using the iterative MMSE technique, a 3-4 dB gain is achieved over the blind interference cancellation scheme which was shown to be equivalent to the 2 transmit/1 receive scenario.

5.2 Threaded Space-Time Architecture

In this section, the performance of the threaded space-time (TST) architecture of the present invention and the combined group interference suppression and space-time coding (TNSC) architecture are compared.

Figure 9:
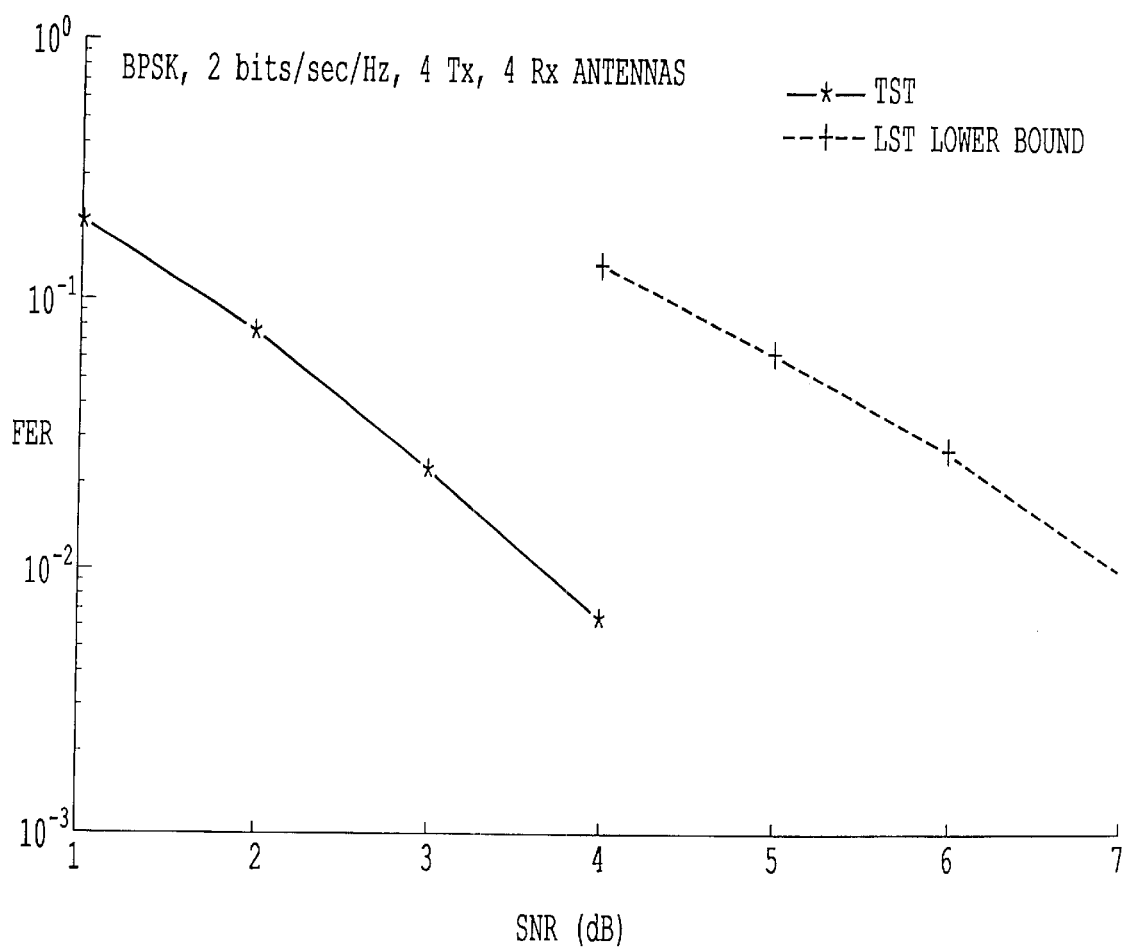
FIGS. 9, 10 and 11 are graphs illustrating the performance of a threaded space-time architecture implemented in accordance with an embodiment of the present invention.
Figure 10:
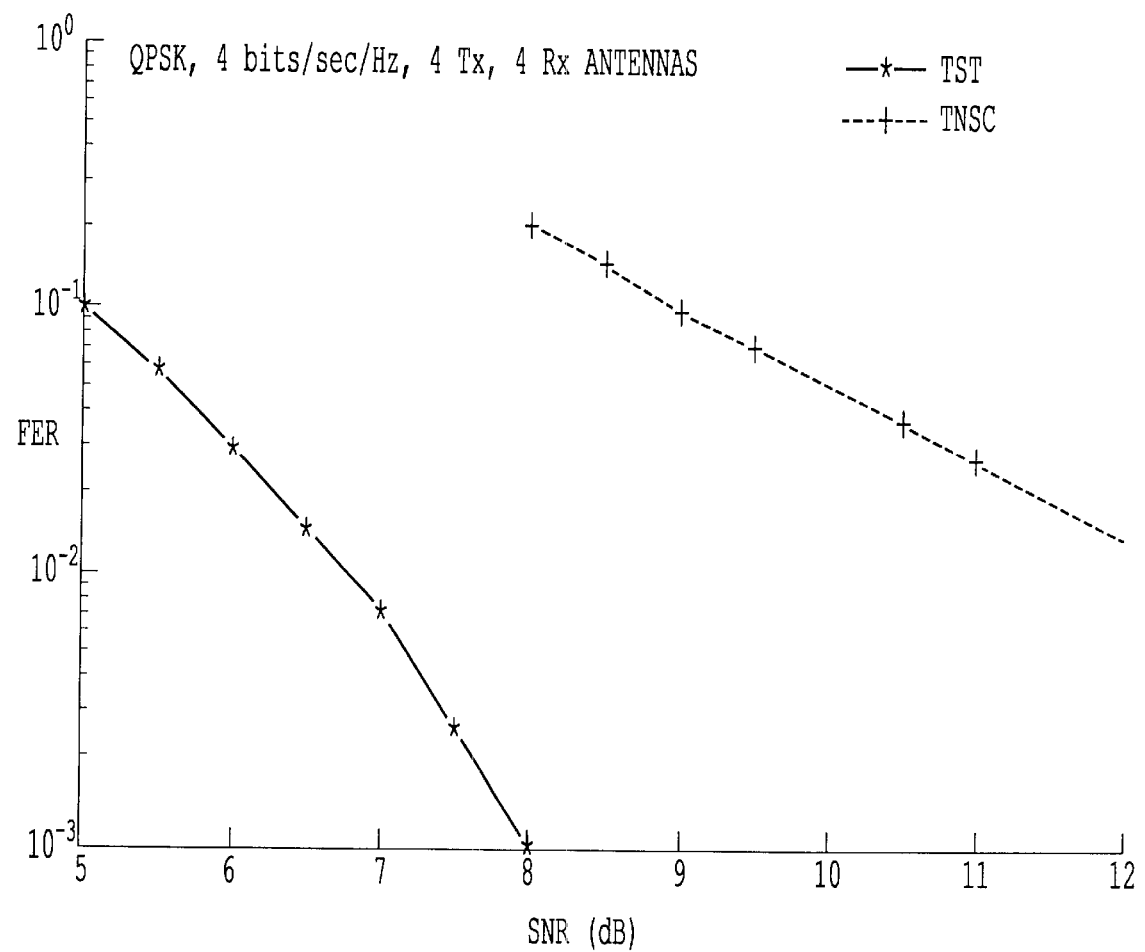
Figure 11:
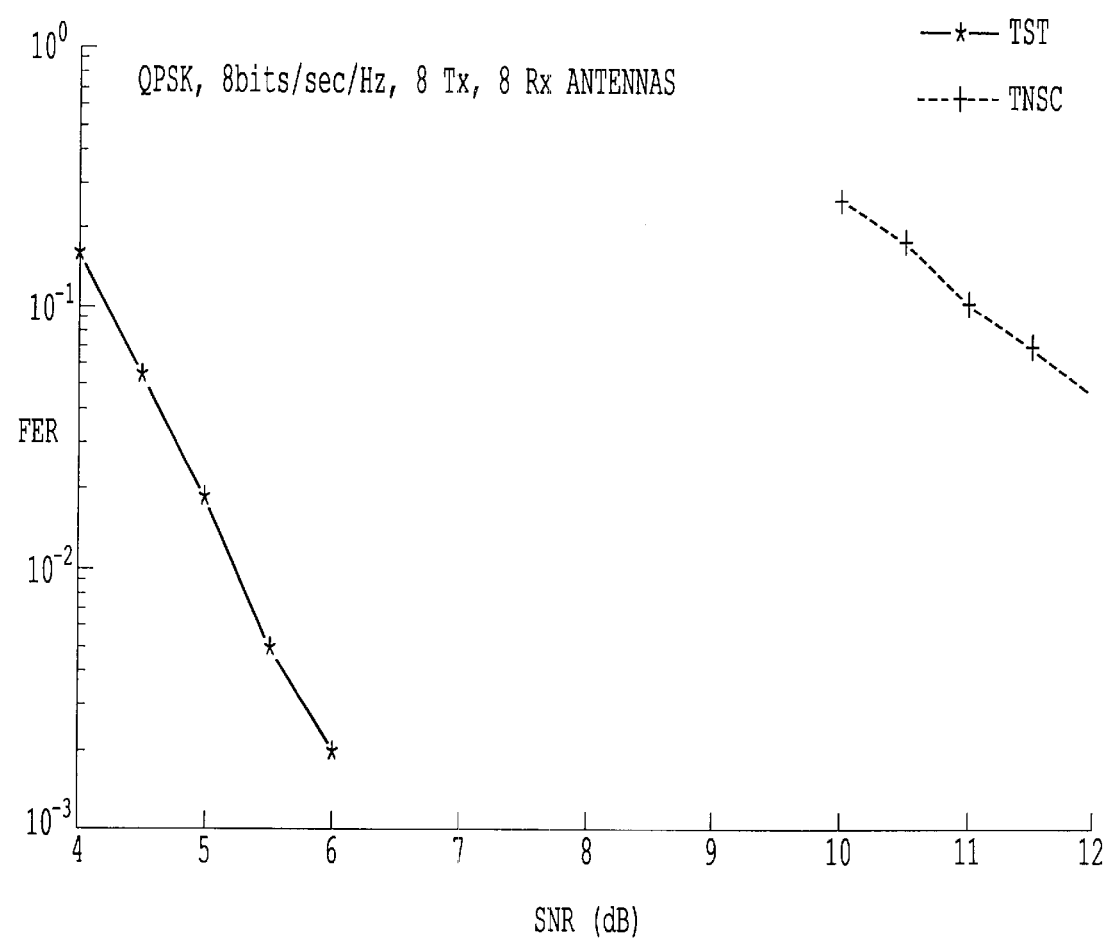

FIGS. 9, 10 and 11 compare the performance of the two schemes for the case of 4 transmit/4 receive and 8 transmit/8 receive antennas, respectively. In the TST architecture, periodic bit interleaving was used to distribute the symbols. QPSK modulation with Gray mapping was used to map the binary input to each antenna to a complex constellation. Hence, the spectral efficiency is 4 bits/sec/hz and 8 bits/sec/hz, respectively. From the figures, the significant gain provided by the TST over the TNSC scheme is clear. Indeed, the TST approach shows a gain of 3-7 dB over the TNSC scheme. The TST results are within 2-3 dB of the outage capacity.

Two main reasons contribute to this advantage. First, the ability of the iterative MMSE receiver 40 of the present invention to eliminate the interference with only a minor loss in the diversity advantage. Second, the generalized stacking construction coupled with the use of convolutional codes with the best minimum distance provide a better coding advantage over the hand-crafted trellis code used by the TNSC architecture. Note also that 8 state codes are used while, in the TNSC architecture, a 32 states codes were used. The gain in diversity advantage achieved by the TST architecture can be seen in the steeper asymptotic slope of the performance curve. It is also shown that the gain provided by the TST increases with the number of antennas, again due to the better exploitation of the diversity in the system.

6. Conclusions

In accordance with the present invention, the design problem for multiple antenna systems operating over the fading channel is addressed. The problem was addressed herein from both a signal processing and a space-time coding perspective. From the signal processing side, a set of iterative algorithms for joint decoding and detection are presented that provide a trade-off between performance and complexity. Simulation results are provided for the iterative MMSE receiver, establishing its ability to approach the interference-free performance lower bound within a fraction of a dB. From the space-time coding perspective, the BPSK modulation scenario was considered. Under this assumption, convolutional based, space-time codes were presented that exploit the spatial diversity provided by both the transmit and receive antennas. The new scheme avoids some of the limitations of the layered space-time architecture. Then, the more general case of arbitrary non-zero complex constellation was considered and a new scheme, the threaded space-time architecture, as presented in accordance with the present invention. This new approach was shown through simulation to achieve a significant gain over combined array processing and space-time coding.

As a final remark, in the absence of interference from other threads, the fading channel is equivalent to the block fading channel with receive diversity, where each fading block is represented by a different antenna. The algebraic framework developed for threaded space-time code design is therefore also useful in the study of code design for block fading channels and is applicable to both block and trellis-based codes.

Although the present invention has been described with reference to a preferred embodiment thereof, it will be understood that the invention is not limited to the details thereof. Various modifications and substitutions have been suggested in the foregoing description, and others will occur to those of ordinary skill in the art. All such substitutions are intended to be embraced within the scope of the invention as defined in the appended claims.

What is claimed is:

1. A method of transmitting symbols in a multi-user wireless communication system have a plurality of transmit antennas and a plurality of receive antennas, the method comprising the steps of:

dividing a data stream into multiple threads, each of said threads comprising said symbols;

transmitting one of said symbols from each of said threads from respective ones of said plurality of transmit antennas during a symbol transmission interval; and interleaving each of said threads.

2. The method of claim 1, prior to the interleaving step further comprising the step of encoding each of said threads.

3. The method of claim 2, wherein each of said threads corresponds to a code word comprising a selected number of said symbols.

4. The method of claim 3, wherein said encoding step comprises the step of employing space-time codes for transmitting said symbols.

5. The method of claim 1, wherein said symbols are transmitted in a set of layers and the transmission in each layer is treated as a space-time code.

6. A method of transmitting symbols in a multi-user wireless communication system have a plurality of transmit antennas and a plurality of receive antennas, the method comprising the steps of:

dividing a data stream into multiple threads, each of said threads comprising said symbols; and transmitting one of said symbols from each of said threads from respective ones of said plurality of transmit antennas during a symbol transmission interval; and wherein said transmitting step comprises the step of transmitting respective said symbols from each of said threads during respective symbols periods to generate a code matrix having rows and columns, said rows and said columns each comprising a plurality of elements, said elements in one of said rows and columns corresponding to respective ones of said plurality of transmit antennas and said elements in the other one of said rows and columns corresponding to respective ones of said symbols in said threads occurring in the same symbol transmission interval.

7. The method of claim 6, wherein said symbols for one of said threads being allocated among consecutive ones of said elements in said code matrix that correspond to said plurality of transmit antennas during consecutive said symbols periods to represent a diagonal line of said elements in said code matrix.

8. The method of claim 6, wherein each of said elements in said code matrix corresponds to one of said symbols and is not zero.

9. An apparatus for transmitting symbols in a multi-user wireless communication system comprising:

a plurality of transmit antennas; and a processing device operable to divide a data stream into multiple threads, each of said threads comprising said symbols, and to transmit one of said symbols from each of said threads from respective ones of said plurality of transmitter antennas during a symbol transmission interval; and said processing device being operable to interleave each of said threads.

10. The apparatus of claim 9, wherein said processing device is further operable to encode each of said threads.

11. The apparatus of claim 10, wherein each of said threads corresponds to a code word comprising a selected number of said symbols.

12. The apparatus of claim 11, wherein said processing device employs space-time codes for transmitting said symbols.

13. The apparatus 9, wherein said processing device transmits said symbols in a set of layers and the transmission in each layer is treated as a space-time code.

14. An apparatus for transmitting symbols in a multi-user wireless communication system comprising:

a plurality of transmit antennas; and a processing device operable to divide a data stream into multiple threads, each of said threads comprising said symbols, and to transmit one of said symbols from each of said threads from respective ones of said plurality of transmitter antennas during a symbol transmission interval; and wherein said processing device is operable to transmit respective said symbols from each of said threads during respective symbols periods to generate a code matrix having rows and columns, said rows and said columns each comprising a plurality of elements, said elements in one of said rows and columns corresponding to respective ones of said plurality of transmit antennas and said elements in the other one of said rows and columns corresponding to respective ones of said symbols in said threads occurring in the same symbol transmission interval.

15. The apparatus of claim 14, wherein said processing device is operable to allocate said symbols for one of said threads among consecutive ones of said elements in said code matrix that correspond to said plurality of transmit antennas during consecutive said symbols periods to represent a diagonal line of said elements in said code matrix.

16. The apparatus of claim 14, wherein said processing device is programmable to provide one of said symbols in each of said elements such that none of said elements is inactive.

17. The apparatus of claim 14, wherein said a multi-user wireless communication system comprises a plurality of receive antennas, said plurality of transmit antennas need not be equal in number to said plurality of receive antennas.

18. A method of multi-user detection of symbols transmitted using space-time codes from a plurality of transmit antennas to a plurality of receive antennas that can be subject to spatial interference, the method comprising the steps of:
receiving streams from said plurality of transmit antennas;
generating estimates of said streams using a soft input/soft output detector;
decoding respective said streams using corresponding soft input/soft output decoders; and
refining processing by said soft input/soft output detector using soft outputs generated by said soft input/soft output decoders.

19. A method as claimed in claim 18, further comprising the step of interleaving each of said streams.

20. A method as claimed in claim 19, further comprising the steps of:
deinterleaving said streams prior to said decoding step; and
interleaving said streams prior to said refining step.

21. A method as claimed in claim 18, wherein said decoding step comprises the step of employing a decoding scheme selected from the group consisting of a maximum a-posteriori scheme, a log-domain maximum a-posteriori scheme, and a soft input Viterbi scheme.

22. A method as claimed in claim 18, wherein said streams comprises symbols, said refining step comprising the step of computing maximum a posteriori probabilites for said symbols.

23. A method as claimed in claim 22, further comprising the steps of:
updating said maximum a posteriori probabilities for said symbols after each said decoding step; and
determining minimum mean square error filter feedforward and feedback coefficents to recalculate said estimates of said streams.

24. A method as claimed in claim 23, wherein said determining step further comprises the steps of:

defining an MMSE estimate $y^{(i)}$ of the i-th antenna symbol at time t as $$y^{(i)} = \underline{w}_f^{(i)T} \underline{r} + w_b^{(i)} \tag{32}$$

where $\underline{w}_f^{(i)}$ is a m×1 optimized feed-forward coefficients vector, $w_b^{(i)}$ is a single coefficient that represents a soft cancellation, and $\underline{w}_f^{(i)}$, $w_b^{(i)}$ corresponds to minimization of the mean square value of the error $$e = E[|y^{(i)} - c^{(i)}|^2]$$

between one of said symbols and the corresponding said estimate thereof such that $$e = E\left[\left|\underline{w}_f^{(i)T} \underline{r} + w_b^{(i)} - c^{(i)}\right|^2\right] \tag{33}$$

$$= E\left[\left|\underline{w}_f^{(i)T} \{\underline{S}^{(i)} c^{(i)} + S^{(n/i)} \underline{c}^{(n/i)} + \underline{n}\} + w_b^{(i)} - c^{(i)}\right|^2\right]$$

where $\underline{S}^{(i)}$ is a m×1 complex signature vector of the $i^{th}$ one of said transmitter antennas, $S^{(n/i)}$ is a m×(n−1) matrix composed of complex signature vectors of the other n−1 said transmitter antennas, and $\underline{c}^{(n/i)}$ corresponds to a (n−1)×1 transmitted data vector from the other n−1 said transmit antennas;

defining relations satisfied by minimum mean square error solutions for $\underline{w}_f^{(i)}$, and $w_b^{(i)}$ such that $$\underline{w}_f^{(i)T} S^{(n/i)} E[\underline{c}^{(n/i)}] + w_b^{(i)} = 0 \tag{34}$$

$$\underline{w}_f^{(i)T} \{\underline{S}^{(i)} \underline{S}^{(i)H} + S^{(n/i)} E[\underline{c}^{(n/i)} \underline{c}^{(n/i)T}] S^{(n/i)H} + E[\underline{n}\underline{n}^H]\} + S^{(n/i)} E[\underline{c}^{(n/i)}] w_b^{(i)} = \underline{S}^{(i)H} \tag{35}$$

where $$E[\underline{n}\underline{n}^H] = N_0 I_{m \times m}$$

$$E[\underline{c}^{(n/i)}] = \underline{\tilde{c}}^{(n/i)}; \text{ and} \tag{36}$$

solving said relations for optimum filter coefficients $$\underline{w}_f^{(i)T} = \underline{S}^{(i)H}(A + B + R_n - FF^H)^{-1}. \tag{38}$$

$$w_b^{(i)} = -\underline{w}_f^{(i)T} F. \tag{39}$$

such that the log-likelihood ratio is $$L^{(i)} = Re(\underline{w}_f^{(i)T} \underline{r} + w_b^{(i)}) \tag{40}$$

wherein $$A = \underline{S}^{(i)} \underline{S}^{(i)H} \tag{41}$$

$$B = S^{(n/i)}[I_{(n-1)\times(n-1)} - Diag(\underline{\tilde{c}}^{(n/i)} \underline{\tilde{c}}^{(n/i)T}) + \underline{\tilde{c}}^{(n/i)} \underline{\tilde{c}}^{(n/i)T}] S^{(n/i)H} \tag{42}$$

$$F = S^{(n/i)} \underline{\tilde{c}}^{(n/i)} \tag{43}$$

$$R_n = N_0 I_{m \times m}. \tag{44}$$

* * * * *